United States Patent
Pham et al.

(10) Patent No.: US 10,411,344 B2
(45) Date of Patent: Sep. 10, 2019

(54) METHOD AND APPARATUS FOR MONITORING AND COMPENSATING FOR ENVIRONMENTAL AND OTHER CONDITIONS AFFECTING RADIO FREQUENCY LIQUID CRYSTAL

(71) Applicant: Kymeta Corporation, Redmond, WA (US)

(72) Inventors: Tung Pham, Renton, WA (US); Phillip Izdebski, Kirkland, WA (US); Mikala C. Johnson, Seattle, WA (US); Taylor Stokes, Monroe, WA (US); Ryan A. Stevenson, Woodinville, WA (US); Jacob Tyler Repp, Monroe, WA (US); Michael Severson, Seattle, WA (US)

(73) Assignee: KYMETA CORPORATION, Redmond, WA (US)

( * ) Notice: Subject to any disclaimer, the term of this patent is extended or adjusted under 35 U.S.C. 154(b) by 0 days.

(21) Appl. No.: 15/794,797

(22) Filed: Oct. 26, 2017

(65) Prior Publication Data

US 2018/0233821 A1    Aug. 16, 2018

Related U.S. Application Data

(60) Provisional application No. 62/413,855, filed on Oct. 27, 2016.

(51) Int. Cl.
*H01Q 3/26* (2006.01)
*H04B 17/10* (2015.01)
(Continued)

(52) U.S. Cl.
CPC ......... *H01Q 3/267* (2013.01); *H01Q 3/2676* (2013.01); *H01Q 15/0066* (2013.01);
(Continued)

(58) Field of Classification Search
None
See application file for complete search history.

(56) References Cited

U.S. PATENT DOCUMENTS

2002/0003497 A1    1/2002    Gilbert et al.
2012/0280770 A1    11/2012   Abhari et al.
(Continued)

OTHER PUBLICATIONS

PCT Application No. PCT/US2017/058788, Notification of Transmittal of the International Search Report and the Written Opinion, dated Feb. 21, 2018, 20 pgs.
(Continued)

*Primary Examiner* — Fayyaz Alam
(74) *Attorney, Agent, or Firm* — Womble Bond Dickinson (US) LLP

(57) ABSTRACT

Monitoring and compensating for environmental and other conditions affecting antenna elements of an antenna is described. The conditions may affect radio frequency (RF) liquid crystal of the antenna elements. In one embodiment, the antenna comprises a physical antenna aperture having an array of surface scattering antenna elements that are controlled and operable together to form a beam for the frequency band for use in holographic beam steering and a compensation controller to perform compensation on the antenna elements based on monitored antenna conditions.

26 Claims, 14 Drawing Sheets

Monitor antenna conditions, including one or more environmental conditions
111

Perform compensation for the antenna based on results from monitoring antenna conditions
112

(51) Int. Cl.
    *H04B 7/185*     (2006.01)
    *H01Q 21/06*     (2006.01)
    *H01Q 15/00*     (2006.01)
    *H01Q 19/06*     (2006.01)
    *H01Q 21/00*     (2006.01)

(52) U.S. Cl.
    CPC ......... *H01Q 19/067* (2013.01); *H01Q 21/005* (2013.01); *H01Q 21/064* (2013.01); *H01Q 21/065* (2013.01); *H04B 7/18515* (2013.01); *H04B 7/18517* (2013.01); *H04B 7/18519* (2013.01); *H04B 17/104* (2015.01)

(56) References Cited

U.S. PATENT DOCUMENTS

| | | | |
|---|---|---|---|
| 2015/0229028 A1* | 8/2015 | Bily | H01Q 13/28 342/371 |
| 2015/0261042 A1 | 9/2015 | Sugaya | |
| 2015/0276926 A1* | 10/2015 | Bowers | G01S 13/887 342/5 |
| 2015/0276928 A1* | 10/2015 | Bowers | H01Q 3/24 342/368 |
| 2015/0318618 A1 | 11/2015 | Chen et al. | |
| 2016/0261042 A1* | 9/2016 | Sazegar | H01Q 3/36 |

OTHER PUBLICATIONS

International Preliminary Report on Patentability for International Application No. PCT/US2017/058788, dated Apr. 30, 2019, 8 pages.

\* cited by examiner

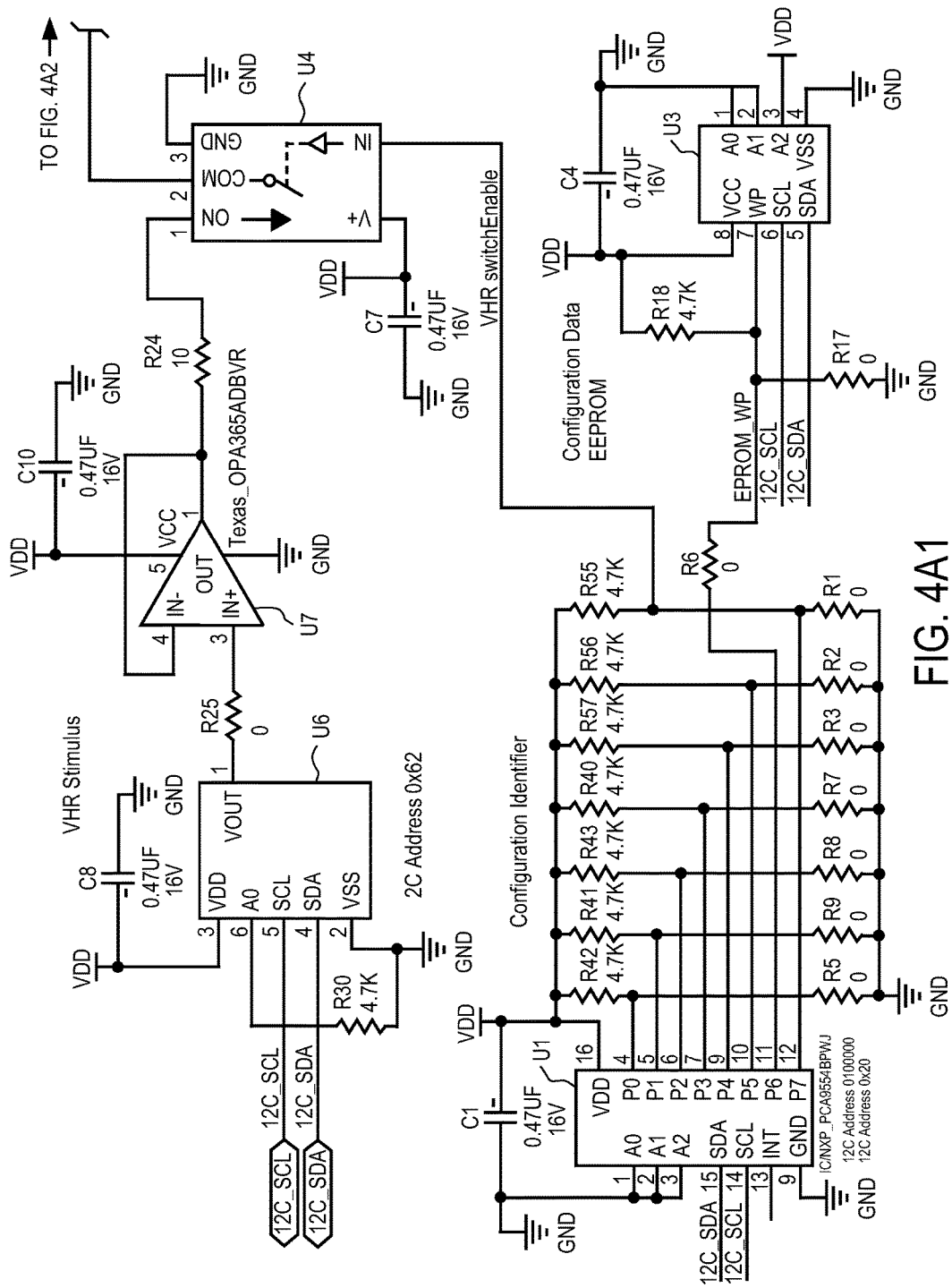
FIG. 4A1

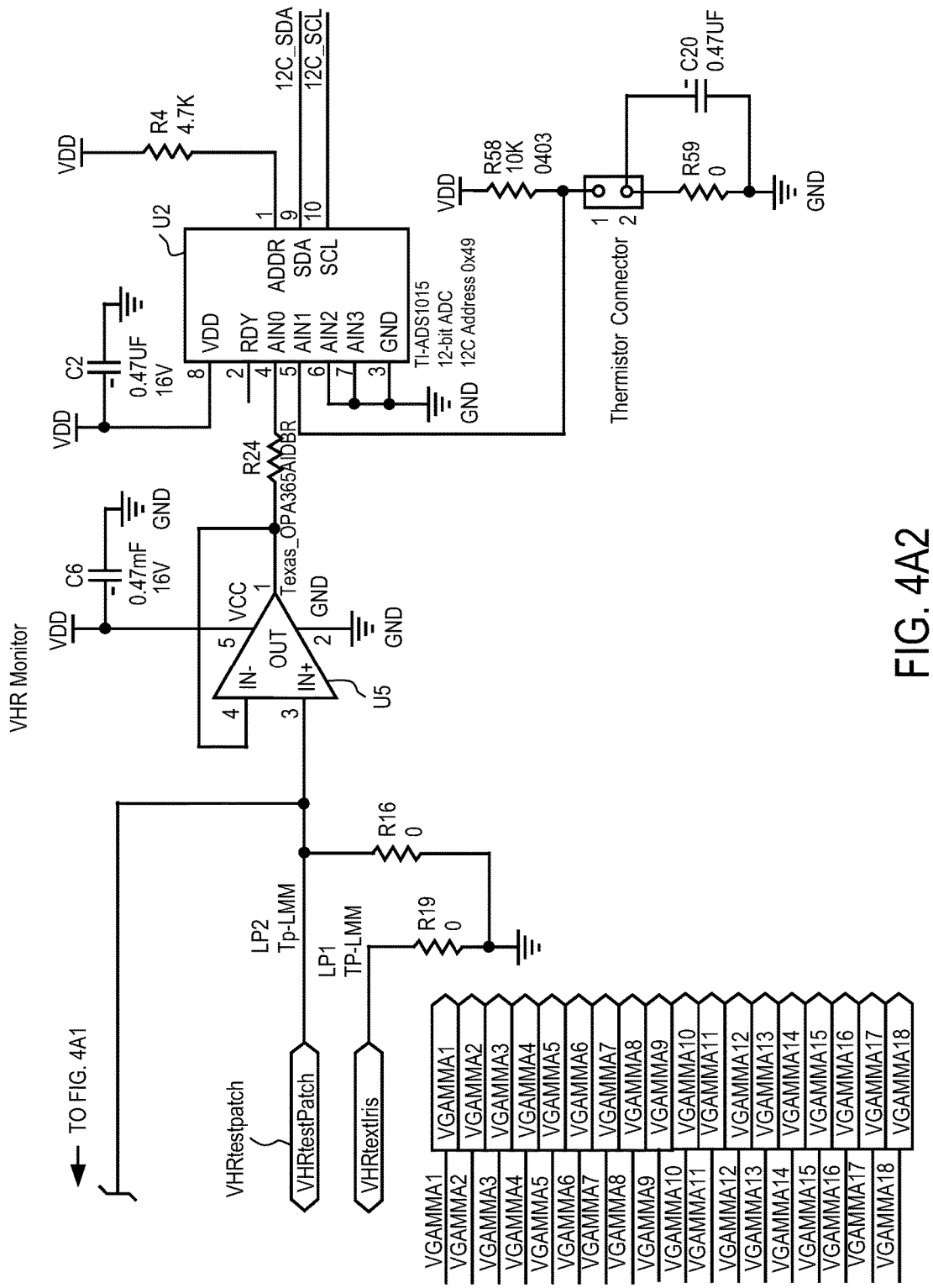
FIG. 4A2

METHOD AND APPARATUS FOR MONITORING AND COMPENSATING FOR ENVIRONMENTAL AND OTHER CONDITIONS AFFECTING RADIO FREQUENCY LIQUID CRYSTAL

PRIORITY

The present patent application claims priority to and incorporates by reference the corresponding provisional patent application Ser. No. 62/413,855, titled, "A Method for Monitoring and Compensating for Environmental and Other Conditions Affecting RFLC," filed on Oct. 27, 2016.

FIELD OF THE INVENTION

Embodiments of the invention relate to antennas used in wireless communication (e.g., satellite communication); more particularly, embodiments of the present invention relate to monitoring and compensating for environmental and/or other conditions affecting liquid crystal that is part of radio-frequency (RF) antenna elements in an antenna.

BACKGROUND OF THE INVENTION

Antennas that are used in satellite communications are subjected to a number of different conditions. These include environmental conditions such as, for example, temperature, pressure and humidity. These conditions including changes in these conditions can at times adversely impact the operation of an antenna or one or more of the antenna's components.

However, depending on the location of the satellite antenna, there may be times when it is difficult to address the conditions that exist on the antenna or its operations, including difficulty in gaining access to the antenna by an individual(s) that support and maintain the antenna.

SUMMARY OF THE INVENTION

Monitoring and compensating for environmental and other conditions affecting antenna elements of an antenna is described. The conditions may affect radio frequency (RF) liquid crystal of the antenna elements. In one embodiment, the antenna comprises a physical antenna aperture having an array of surface scattering antenna elements that are controlled and operable together to form a beam for the frequency band for use in holographic beam steering and a compensation controller to perform compensation on the antenna elements based on monitored antenna conditions

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIGS. 4A1-A2 and 4B illustrate a schematic of a portion of one embodiment of a subsystem for monitoring and compensating for radio frequency (RF) changes in liquid crystal (LC) due to antenna conditions.

DETAILED DESCRIPTION

In the following description, numerous details are set forth to provide a more thorough explanation of embodiments of the present invention. It will be apparent, however, to one skilled in the art, that the present invention may be practiced without these specific details. In other instances, well-known structures and devices are shown in block diagram form, rather than in detail, in order to avoid obscuring the present invention.

Embodiments of the present invention disclosed herein include a subsystem and method for autonomously monitoring and compensating for radio frequency (RF) changes in the liquid crystal (LC) due to environmental conditions to ensure aperture efficiency. In one embodiment, the LC is part of RF radiating antenna elements of an antenna aperture. Examples of such an antenna are described in more detail below. Note that the disclosed techniques are not limited to use in the antennas described herein and may be used in other types of antennas.

The monitoring and compensating techniques described herein enable an antenna to be self-supported in the field. More specifically, the monitoring and compensating techniques described herein enables an antenna to work in extreme operating conditions without a degradation in RF performance.

In one embodiment, the monitoring and compensation is performed using software. A software implementation allows monitoring and compensation techniques described herein to be applied to and integrated into various antennas and their apertures without the added complexity of custom circuitry.

Figure 1:
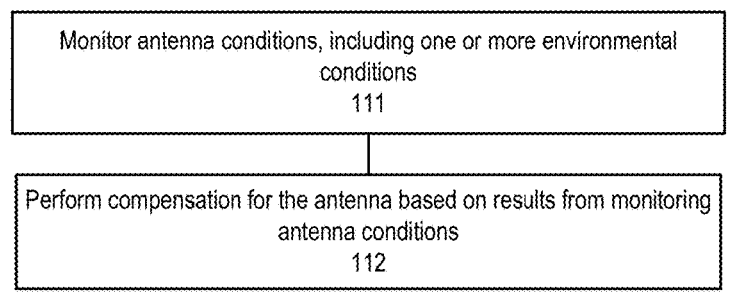
FIG. 1 is a flow diagram of one embodiment of a process for monitoring and compensating for radio frequency (RF) changes in liquid crystal (LC) due to antenna conditions.

FIG. 1 is a flow diagram of one embodiment of a process for monitoring and compensating for radio frequency (RF) changes in liquid crystal (LC) due to antenna conditions. In one embodiment, the processes are performed by processing logic that may comprise hardware (circuitry, dedicated logic, etc.), software (e.g., software running on a chip), firmware, or a combination of the three. In one embodiment, the processing logic is part of an antenna that includes a metasurface having RF radiating surface scattering antenna elements.

Referring to FIG. 1, the process begins by monitoring antenna conditions, including one or more environmental conditions (processing block 111). In one embodiment, the antenna conditions that are monitored impact the RF performance of the antenna elements. In one embodiment, the antenna conditions that are monitored impact the performance of LC in the antenna elements.

There are a number of environmental conditions that may be monitored, including, but not limited to: temperature; humidity; and pressure (barometric). In one embodiment, a number of other conditions are monitored including, but not limited to, LC aging and phase aperture illumination (achieves desired illumination and the desired phase variation across the aperture to optimize antenna efficiency).

In one embodiment, the monitoring of these conditions is performed using sensors. For example, in one embodiment, a temperature sensor measures temperature, a humidity sensor measures humidity, and a pressure sensor measures pressure.

The sensors may be located on the antenna aperture, inside the antenna aperture, or near the antenna aperture. For example, in one embodiment, a temperature sensor is inside the antenna near but not on the LC itself (e.g., on the same substrate (e.g., glass layer) as the antenna elements, under a radome of the antenna, on a control board located behind or near the substrate as the antenna elements, etc.), while the humidity sensor is on a control board. In one embodiment, the temperature sensor is also on the control board. In one embodiment, the pressure sensor is located on the control board.

Note that the monitoring of other conditions does not require sensors. For example, in one embodiment, LC aging is monitored. More specifically, LC aging depends on time, and therefore, the time the LC is on (e.g., when a voltage is applied to the LC such that the antenna element having the LC is on) is tracked using memory (e.g., local memory or remote memory (e.g., cloud-based memory)). In one embodiment, the amount of time the LC is on is tracked by the controller that controls the turning off and on of individual antenna elements. In another embodiment, the LC aging is tracked by tracking the number of times voltage changes are made with respect to one or more antenna elements. Thus, even if the voltage of a particular antenna element (or test antenna element) is never adjusted, its LC aging for tracking purposes still increases when the voltages of other antenna elements is changed over time.

With respect to pressure, an alternative to having a pressure sensor to take a direct pressure measurement is to use a global positioning system (GPS) on the antenna to identify the location of the antenna and then use the location information to obtain pressure information for that location (e.g., for the elevation). In one embodiment, the antenna accesses a remote system to obtain the pressure data for the antenna's location using the location data.

As for the phase aperture illumination, in one embodiment, the illumination is not measured directly, and an indirect indication is used to indicate this condition. In one embodiment, the indirect indication is the degrading gain of the antenna. In one embodiment, the degradation of gain is indicated by the signal-to-noise ratio (SNR) of the antenna or some other signal quality measure that is feed back to the antenna from, for example, a satellite. This gain indication information is stored in a memory of the antenna and accessed for comparison against a predefined gain value that the antenna is trying to achieve. Based on the comparison, a determination can be made as to whether compensation is necessary.

Next, processing logic performs compensation for the antenna based on results from monitoring the antenna conditions (processing block 112). In one embodiment, the results of monitoring indicate that one or more conditions exist, and the existence of such a condition(s) causes compensation to be performed. For example, if temperature monitoring indicates that the temperature of the antenna aperture is below the temperature that is preferred, and potentially optimum, for the LC to perform its function as part of the antenna elements, then compensation may be performed (e.g., voltage adjustments for antenna elements).

In another embodiment, the results of monitoring indicate that a change in one or more conditions has occurred and the change or changes warrants that compensation is performed. For example, if evaluating the data from the temperature sensor indicates a change in temperature has occurred, then compensation is performed. In one embodiment, the amount of compensation is directly related to the amount of change in the environmental condition. For example, if a predetermined amount of change in temperature occurs, then a predetermined amount of compensation is performed. In one embodiment, the amount of compensation (e.g., voltage adjustment) is made to obtain a predetermined aperture illumination.

In one embodiment, the compensation is in the form of voltage adjustments to the voltage that is applied to the LC that is included as part of the antenna elements. Thus, the voltage adjustments compensate for one or more of the various conditions being monitored. In one embodiment, the voltage adjustments are based on the amount of change in one or more environmental conditions. For example, if the monitoring indicates that the temperature has changed by a set amount, then a predetermined amount of voltage change is made to the voltage being applied to the LC.

In one embodiment, at each condition, the antenna controller generates a new pattern of voltages that are to be applied to antenna elements (e.g., applied to the LC in the antenna elements). For any new specific pattern, the voltage applied to some LCs of antenna elements might increase, while the voltage applied to other might decrease. Some LCs of antenna elements might receive the same voltage as the last pattern. For example, increases in temperature increase the cell gap, which shifts resonance frequencies higher. Therefore, in general, voltages are shifted higher to compensate for the temperature increase. In one embodiment, if the temperature goes above 35 C (or higher), the gain will drop, and once this drop is detected (e.g., software detects the drop), the antenna controller (e.g., software being run by the antenna controller) generates a new pattern based on the temperature and other sensors to increase the gain. The compensated voltage response for a pressure decrease would be similar to that of temperature. For humidity, in general, a new optimized pattern is defined in which specific element voltages might go up or down. For LC aging, to compensate for an LC aging increase, in general, voltages are increase. For aperture illumination, in general, the pattern undergoes a re-optimization to select voltages for the antenna elements that result in the desired beam.

In one embodiment, the compensation performed for monitored conditions is reprogrammable. In this manner, the antenna can be adapted to different operating conditions over time.

By performing compensation based on results of monitoring the antenna conditions (e.g., one or more environmental conditions), the aperture is able to maintain performance over time in the field. In one embodiment, the performance factor that is being maintained is higher antenna gain. In alternative embodiments, the performance factor(s) include one or more of desired sidelobe levels and/or cross-polarization levels. Thus, the compensation enables the aperture to maintain its functions without the need to switch out glass substrates or circuits. The antenna can take care of itself and do self-support, i.e., the antenna determines that something has occurred and compensates for it. In one embodiment, the compensation enables (1) the antenna aperture to work in extreme environmental conditions where, without these techniques, RF degradation could preclude establishing a satellite link; (2) removes additional and custom circuitry necessary for operating in extreme environmental conditions; (3) reduces, and potentially minimizes, the circuitry need for active heating; and (4) removes the necessity for active cooling.

In one embodiment, the monitoring and compensation system is software-based. In one such embodiment, the temperature (or other condition) is monitored via a chip (sensor) that outputs data to software that controls the monitoring process. In one embodiment, the software outputs the required voltage adjustment for compensation, if any is required.

In one embodiment, the antenna aperture has an internal heater that is used to increase the temperature of the LC to a minimum temperature at which the LC provides its best performance (e.g., best frequency response), allowing the monitoring and compensation subsystem to operate and compensate for temperatures above the minimum. Note that the other conditions discussed herein can be monitored and compensation may be performed under software control in the same manner as the monitoring and compensation is performed for temperature.

Embodiments of the invention have one or more of the following advantages. For example, for temperature compensation:
 does not require changes in the supply voltage to compensate for temperature;
 software compensation that does not require any additional circuitry; and
 does not require temperature compensation circuity in the liquid crystal itself.

Figure 2:
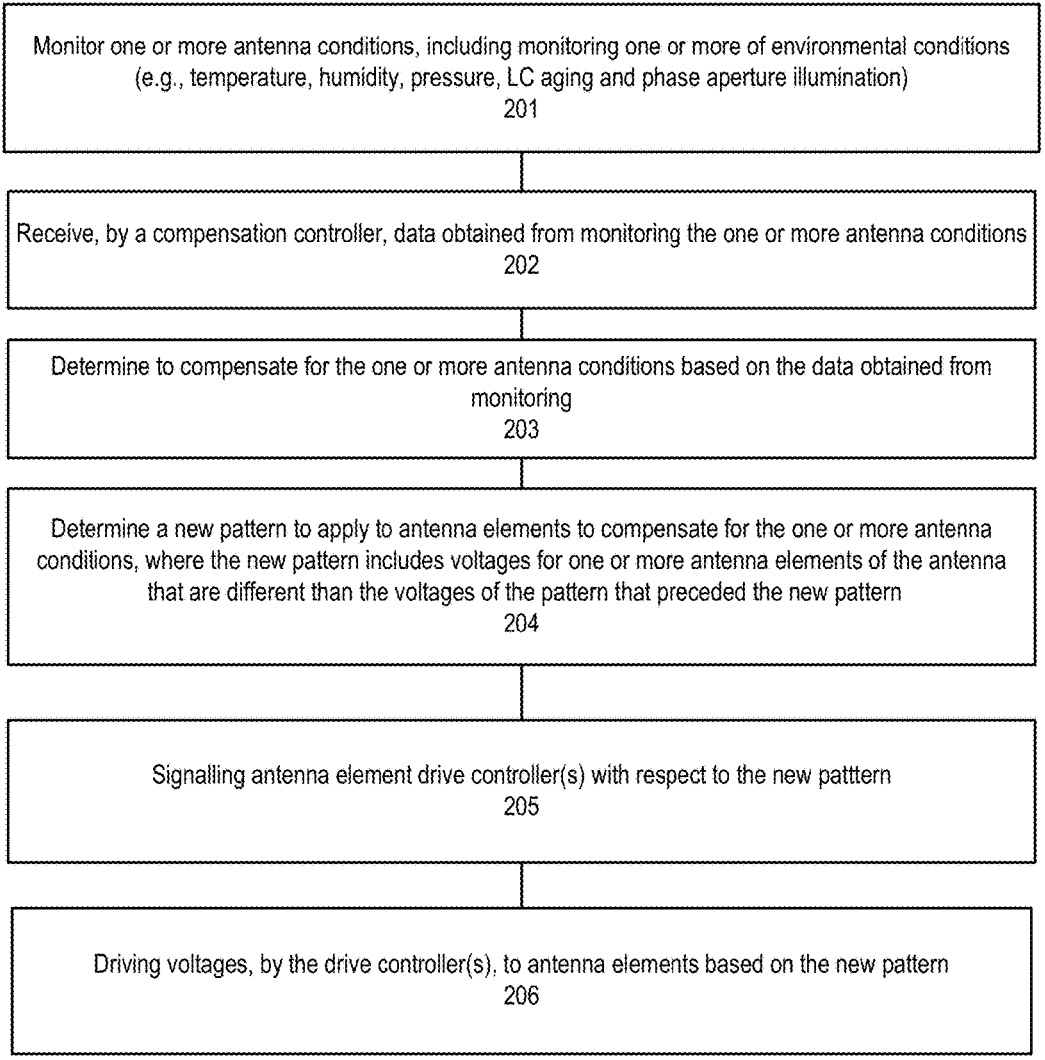
FIG. 2 is a flow diagram of another embodiment of a process for monitoring and compensating for radio frequency (RF) changes in liquid crystal (LC) due to antenna conditions.

FIG. 2 is a flow diagram of another embodiment of a process for monitoring and compensating for radio frequency (RF) changes in liquid crystal (LC) due to antenna conditions. In one embodiment, the processes are performed by processing logic that may comprise hardware (circuitry, dedicated logic, etc.), software (e.g., software running on a chip), firmware, or a combination of the three. In one embodiment, the processing logic is part of an antenna that includes a metasurface having RF radiating surface scattering antenna elements. Examples of such an antenna are discussed in more detail below.

Referring to FIG. 2, the process starts with processing logic monitoring one or more antenna conditions, including monitoring one or more of environmental conditions (processing logic 201). In one embodiment, the antenna conditions that are monitored impact the RF performance of the antenna elements. In one embodiment, the antenna conditions that are monitored impact the performance of LC in the antenna elements. These conditions include one or more of temperature, humidity, pressure, LC aging and phase aperture illumination.

Processing logic receives data obtained from monitoring the one or more antenna conditions (processing block 202) and determines whether to compensate for the one or more antenna conditions based on the data obtained from monitoring (processing block 203). In one embodiment, the processing logic is part of a compensation controller in the antenna.

The determination of whether to perform compensation may be based on a specific value that is returned at part of the monitoring or may be based on an amount of change that has occurred with respect to a specific value that is being monitored. For example, after a temperature sensor provides data indicative of the temperature of the antenna, the processing logic may determine that a voltage adjustment is necessary to LC-based surface scattering antenna elements based on that particular temperature. In one embodiment, a temperature increase of, for example, 10° Celsius causes an adjustment of all of all or a majority of antenna element voltages by 0.5 Volts. This adjustment preserves the holographic modulation pattern and produces antenna performance equivalent to the room temperature voltages In response to determining that compensation is needed based on the results of monitoring, processing logic determines a new pattern to apply to antenna elements to compensate for the one or more antenna conditions, where the new pattern is a holographic diffraction pattern that includes voltages for one or more antenna elements of the antenna (processing block 204). The holographic diffraction pattern being new means that at least one or more of the voltages that are applied to the antenna elements are different than one or more voltages of the pattern that preceded the new pattern (e.g., the pattern currently being applied to the antenna elements). As discussed in more detail below, in one embodiment, the holographic diffraction pattern is a control pattern specifying voltages to turn individual antenna elements in the antenna aperture on or off.

Once the new pattern has been identified, processing logic signals one or more antenna element drive controllers with respect to the new pattern (processing block 205). In one embodiment, the antenna aperture comprises a number of segments of antenna elements that are coupled together to form an antenna aperture having a single array of antenna elements. In such a case, in one embodiment, each segment has its own drive controller that is responsible for driving voltages to the individual antenna elements of its respective segment.

Using the new pattern, processing logic drives voltages to the antenna elements (processing block 206). In one embodiment, the processing logic is part of a driver controller.

Figure 3:
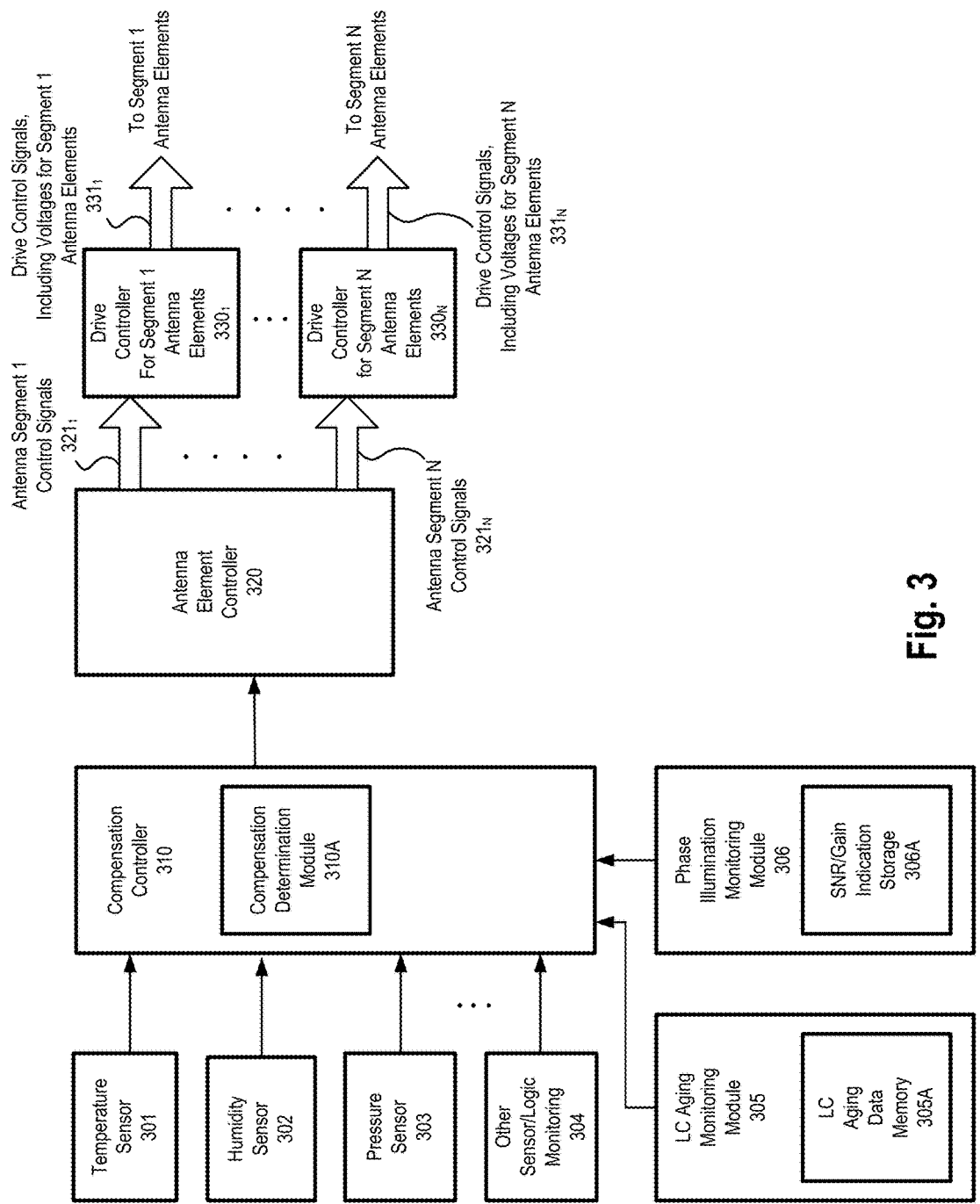
FIG. 3 is a block diagram of one embodiment of a subsystem for monitoring and compensating for radio frequency (RF) changes in liquid crystal (LC) due to antenna conditions.
Figure 4B:
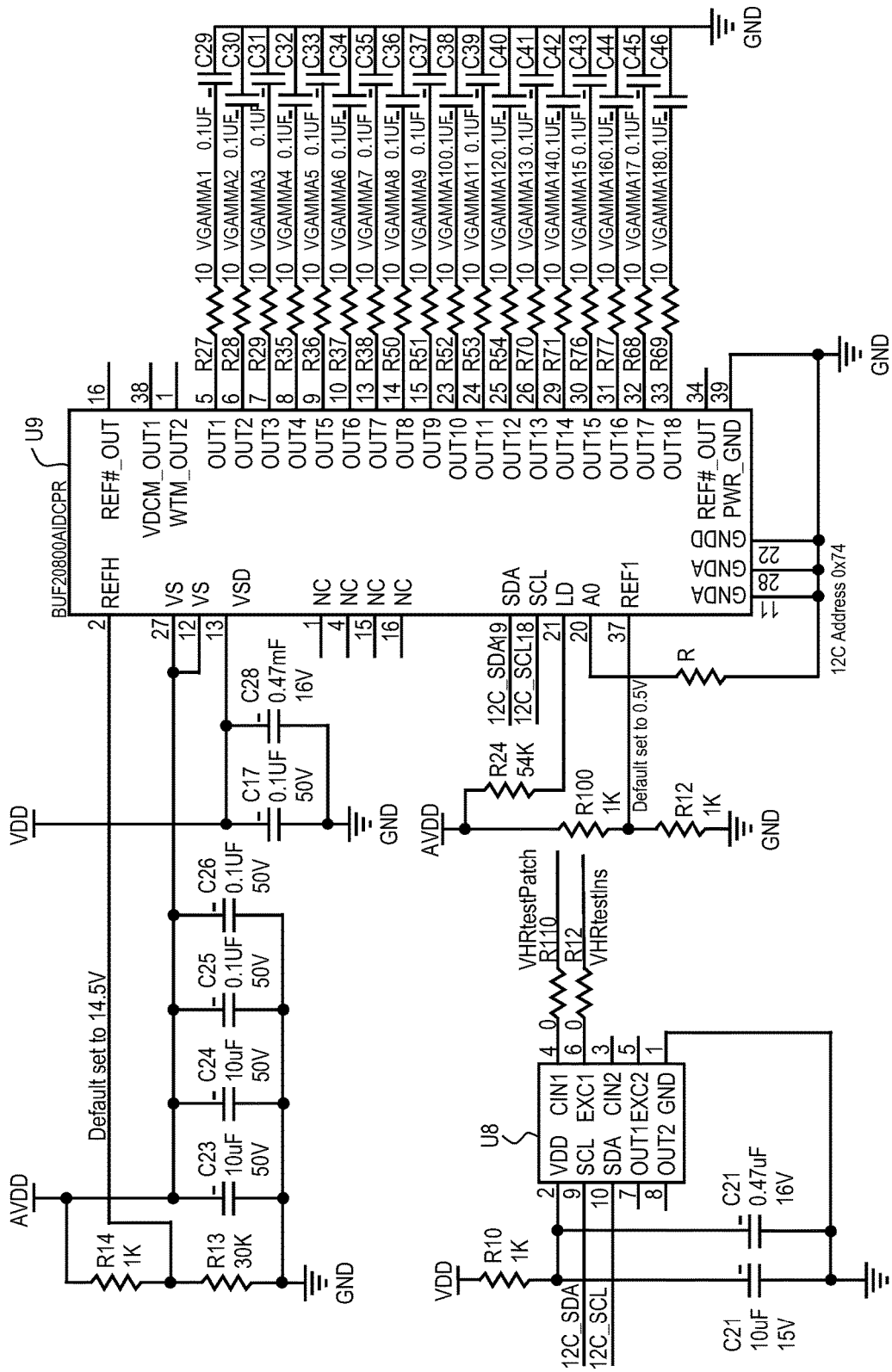

FIG. 3 is a block diagram of one embodiment of a subsystem for monitoring and compensating for radio frequency (RF) changes in liquid crystal (LC) due to antenna conditions. Referring to FIG. 3, a compensation controller 310 receives input data on a number of conditions being monitored. In one embodiment, compensation controller 310 receives data indicating the temperature from temperature sensor 301, data indicating humidity from humidity sensor 302, data indicting pressure from pressure sensor 303, data indicating the state of one or more other conditions from sensor/monitoring logic 304, data indicating the LC aging from LC aging monitoring module 305 and data indicating the phase illumination from phase illumination monitoring module 306. In one embodiment, the monitored data from sensors and monitoring modules is provided in response to a request from compensation controller 310.

In one embodiment, sensors, such as sensors 301-303 are located within the antenna aperture in proximity to the LC-based antenna elements. In this way, the data obtained from the sensor reflects the conditions being experienced by the antenna elements. In another embodiment, one or more sensors are located near one or more replica, or test, antenna elements that may be used to test of the various conditions. The test antenna element may be located outside, but near the array of antenna elements in the antenna aperture. In one embodiment, the test antenna element is a scaled version of the antenna elements in the aperture.

With respect to the other monitoring logic 304, data from other monitoring may also be used to perform compensation. For example, in one embodiment, a circuit applies the voltages to an LC test patch (a replica antenna element) that is in the antenna aperture and the LC test patch is monitored. In one embodiment, the LC test patch is located proximally to the other LCs in the antenna. In one embodiment, the discharge rate of the LC in the LC test patch is monitored to determine if compensation is needed. Based on the results of monitoring, compensation may be performed on the LCs of the antenna elements in the antenna.

In another embodiment, other monitoring logic 304 obtains data from remote locations that is indicative of one or more conditions of the antenna. For example, in one embodiment, other monitoring logic 304 uses its GPS or other coordinates indicating the location of the antenna to obtain external conditions (e.g., pressure, humidity, temperature, etc.) about the particularly location from a remote location (e.g., cloud-based system and/or memory) and then provides them to compensation controller 310.

In one embodiment, LC aging monitoring module 305 include a memory 305A that stores the LC aging data. In one embodiment, the data stored in memory 305A is provided by the antenna controller that causes holographic diffraction patterns to be driven to the antenna elements because the controller is able to track the number of times patterns have been driven onto the antenna elements (e.g., track how often antenna elements are turned off and on). In one embodiment, LC aging monitoring module 305 is part of the antenna controller and provides the LC aging data in response to a request from compensation controller 310.

In one embodiment, phase illumination monitoring module 306 include a memory 306A that stores data indicative of the phase illumination of the antenna. In one embodiment, the data indicative of the phase illumination of the data is information indicative of the gain of the antenna. In one embodiment, the data indicative of the gain of the antenna comprises signal-to-noise ratio (SNR) of the antenna. In one embodiment, the data stored in memory 306A is provided by the antenna feedback received as part of normal communication. For example, such antenna feedback may be received from a satellite with which the antenna is communicating.

In one embodiment, LC aging monitoring module 305 and phase illumination module 306 comprise hardware (circuitry, dedicated logic, etc.), software (e.g., software running on a chip), firmware, or a combination of the three.

Note that embodiments of the present invention may not monitor all of these conditions or may monitor some of these conditions with one or more additional conditions.

In response to the monitored data, compensation controller 310 uses a compensation determination module 310A to determine if compensation is needed. In one embodiment, compensation determination module 310A determines the compensation that is necessary based on the individual values that are received. In one embodiment, the compensation includes adjustments in the voltages applied to the antenna elements. In one embodiment, the voltage adjustments selected are those that cause the antenna aperture to provide a desired beam (illumination) and/or frequency response of the antenna. In one embodiment, the voltage adjustments selected are those that cause the antenna aperture to provide a desired gain, which causes a change in the frequency response.

In one embodiment, compensation determination module 310A comprises hardware (circuitry, dedicated logic, etc.), software (e.g., software running on a chip), firmware, or a combination of the three. In one embodiment, compensation determination module 310A is part of the antenna controller that controls the driving of the antenna elements and the compensation determination is integrated into the holographic diffraction pattern selection for the antenna.

Compensation controller 310 sends an indication to antenna element controller 320 that compensation needs to be performed based on the monitored data. In one embodiment, compensation controller 310 indicates the type and/or amount of compensation that needs to be performed. In one embodiment, compensation controller 310 specifies a new pattern to be used to drive the antenna elements. In another embodiment, antenna element controller 320 determines the new pattern based on the information that is provided by compensation controller 310.

Antenna element controller 320 provides control signals to one or more drive controllers to cause the new pattern to be driven onto the antenna elements. In one embodiment, where the antenna aperture comprises a plurality of segments of antenna elements coupled together to form a single array, antenna element controller 320 send antenna segment controls signals to the respective drive controller. For example, antenna element controller 320 sends antenna segment 1 control signals $321_1$ to antenna segment 1 drive controller $330_1$.

In response to the control signals, drive controllers $330_1$-$330_N$ drive control signals including voltages to the antenna elements. For example, antenna segment 1 drive controller $330_1$ drives control signals including voltages to the segment 1 antenna elements.

One Embodiment of a Sample and Hold Circuit used for Monitoring/Compensation

In one embodiment, monitoring is performed using a sample and hold circuit. In one embodiment, the sample and hold circuit captures the discharge time associated with a test, or replica, of an antenna element. An example of such a circuit is shown in FIGS. 4A1, 4A2 and 4B.

In general, software controls a Digital to Analog Converter (DAC) on a breakout board to set the voltage for the voltage holding ratio (VHR) TEG (test element group), which is a test patch or structure. In one embodiment, the voltage ranges from 0-3.3V. This voltage goes to a voltage follower operational amplifier (OPamp). Then software closes a switch that allows this voltage to charge up the VHR TEG. An Analog to Digital Converter (ADC) is connected to the VHR TEG. Software uses the ADC to measure the voltage of the VHR over time.

In one embodiment, the operations to monitor the VHR TEG are as follows:
1. Set DAC voltage to 3.3v;
2. Close the gate to the VHR TEG;
3. Monitor the voltage of the VHR TEG with the ADC;
4. Once the VHR tag reaches 3.3v, open the gate to the VHR TEG; and
5. Software continues to monitor the voltage and measure how long it would take for the voltage to discharge.

This discharge time changes over time and may change over temperature or other environmental conditions, or parameters. Examples of the environmental conditions are discussed above. The change is characterized and the antenna is tuned or adjusted accordingly to get the best performance possible. That is, based on the discharge time of the VHR TEG, the voltage for the LCs in the aperture is adjusted and/or set. A controller takes that voltage value and controllers the drivers for the LCs to provide that voltage to the LCs.

Referring to FIGS. 4A1, 4A2 and 4B, the circuit provides a voltage to an LC until it charges up fully. Then, the voltage is switched off, thereby allowing the LC to discharge. The discharge voltage is output from the circuit. In one embodiment, the output of the circuit (i.e., the discharge voltage) is monitored by software to determine the discharge time of an LC. This indicates whether the LC is degrading or how the LC is acting in view of different conditions (e.g., environmental conditions). Based on changes to the discharge time of the LC, compensation (e.g., voltage adjustments) are performed.

Note that in one embodiment, only a single LC is being monitored for each antenna segment. Therefore, if the antenna aperture is made up of four segments, an LC on each segment is monitored and separate compensation (e.g., voltage adjustments) is performed for each segment. In another embodiment, the results of monitoring multiple segments are taken collectively to perform compensation for the multiple segments. In such a case, in one embodiment, the same determined compensation (e.g., voltage adjustments) are applied to multiple segments of the antenna aperture.

In one embodiment, the single LC being monitored is not the same size as the LCs being used in the antenna elements in the antenna aperture. In one embodiment, the single LC being monitored is smaller than the LCs in the aperture. In this case, any adjustments that would be required for the single LC are scaled for the LCs in the aperture. For example, in one embodiment, if the single LC being monitored is only ½ the size of the LCs in the aperture, any voltage adjustment that would be made to the single LC is doubled for that of the LCs in the aperture. As another example, in one embodiment, if the voltage to the single test LC needs only a 10% adjustment, then the voltage to the LCs in the aperture used by the antenna for transmit and/or receive are adjusted by 10% (even though the voltages to the single test LC and the non-test LCs in the aperture are different).

Note also that in one embodiment any voltage adjustment that is performed to compensate for conditions affecting the LC performance are chosen based on the size and structure of the antenna element containing the LC, including the amount of LC in the antenna element.

Referring back to FIGS. 4A1, 4A2 and 4B below, software commands DAC U6 to output a voltage. In one embodiment, the voltage is between 0 and 3.3v. The voltage is buffered by opamp U7. Thus, DAC U6 and opamp U7 provide the VHR stimulus. Note that components other than the combination of a DAC and an opamp may be used to provide a voltage.

Switch U4 permits the voltage to be applied to the LC (shown as VHRtestpatch) of the test patch. In one embodiment, switch U4 is controlled by controller U1. When switch U4 is closed, the LC of the test patch is charged up. Once the LC has charged up, switch U4 is opened and the LC is permitted to discharge.

The discharge voltage flows to and is strengthened by opamp U5 and output to monitoring software at ADC U2. Thus, opamp U5 and ADC U2 operate as the VHR monitor. The monitoring software reads, stores and tracks the voltage to determine the discharge time and then adjusts the voltage based on the change in conditions (e.g., environmental conditions) that occur at the time.

Note that the circuit also includes a configuration data EEPROM U3 and a configuration identifier coupled to the U1 controller that operate as the enable for switch U4.

In one embodiment, an IC U8 detects (measures) the actual capacitance of the VHR tag. In one embodiment, this is also used as a metric for LC aging. In one embodiment, U9 is used to set the reference voltages for the chip that control the voltages that are used to drive the LC.

Examples of Antenna Embodiments

The techniques described above may be used with flat panel antennas. Embodiments of such flat panel antennas are disclosed. The flat panel antennas include one or more arrays of antenna elements on an antenna aperture. In one embodiment, the antenna elements comprise liquid crystal cells. In one embodiment, the flat panel antenna is a cylindrically fed antenna that includes matrix drive circuitry to uniquely address and drive each of the antenna elements that are not placed in rows and columns. In one embodiment, the elements are placed in rings.

In one embodiment, the antenna aperture having the one or more arrays of antenna elements is comprised of multiple segments coupled together. When coupled together, the combination of the segments form closed concentric rings of antenna elements. In one embodiment, the concentric rings are concentric with respect to the antenna feed.

Examples of Antenna Systems

In one embodiment, the flat panel antenna is part of a metamaterial antenna system. Embodiments of a metamaterial antenna system for communications satellite earth stations are described. In one embodiment, the antenna system is a component or subsystem of a satellite earth station (ES) operating on a mobile platform (e.g., aeronautical, maritime, land, etc.) that operates using either Ka-band frequencies or Ku-band frequencies for civil commercial satellite communications. Note that embodiments of the antenna system also can be used in earth stations that are not on mobile platforms (e.g., fixed or transportable earth stations).

In one embodiment, the antenna system uses surface scattering metamaterial technology to form and steer transmit and receive beams through separate antennas. In one embodiment, the antenna systems are analog systems, in contrast to antenna systems that employ digital signal processing to electrically form and steer beams (such as phased array antennas).

In one embodiment, the antenna system is comprised of three functional subsystems: (1) a wave guiding structure consisting of a cylindrical wave feed architecture; (2) an array of wave scattering metamaterial unit cells that are part of antenna elements; and (3) a control structure to command formation of an adjustable radiation field (beam) from the metamaterial scattering elements using holographic principles.

Antenna Elements

Figure 5:
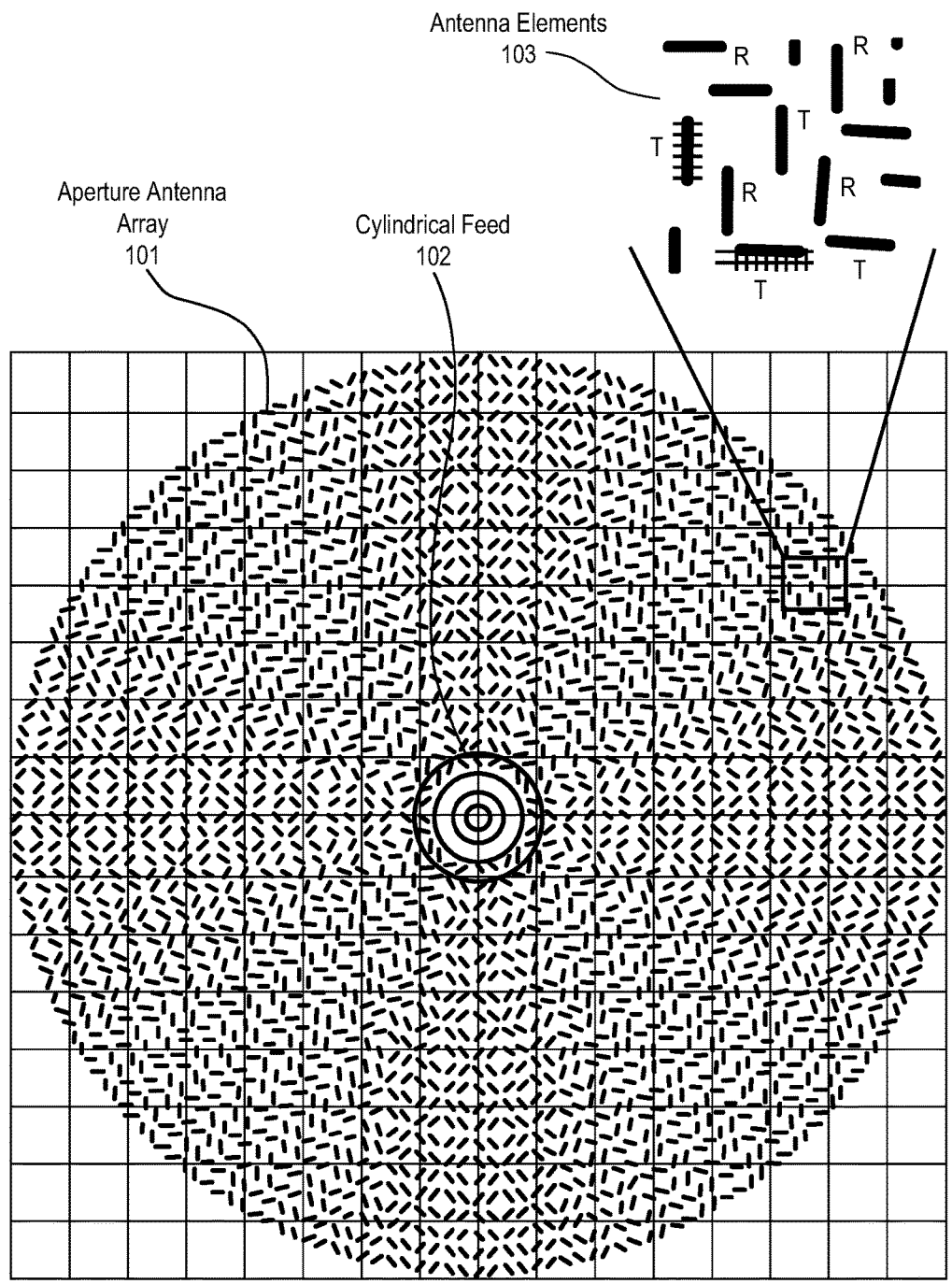
FIG. 5 illustrates the schematic of one embodiment of a cylindrically fed holographic radial aperture antenna.

FIG. 5 illustrates the schematic of one embodiment of a cylindrically fed holographic radial aperture antenna. Referring to FIG. 5, the antenna aperture has one or more arrays 101 of antenna elements 103 that are placed in concentric rings around an input feed 102 of the cylindrically fed antenna. In one embodiment, antenna elements 103 are radio frequency (RF) resonators that radiate RF energy. In one embodiment, antenna elements 103 comprise both Rx and Tx irises that are interleaved and distributed on the whole surface of the antenna aperture. Examples of such antenna elements are described in greater detail below. Note that the RF resonators described herein may be used in antennas that do not include a cylindrical feed.

In one embodiment, the antenna includes a coaxial feed that is used to provide a cylindrical wave feed via input feed 102. In one embodiment, the cylindrical wave feed architecture feeds the antenna from a central point with an excitation that spreads outward in a cylindrical manner from the feed point. That is, a cylindrically fed antenna creates an outward travelling concentric feed wave. Even so, the shape of the cylindrical feed antenna around the cylindrical feed can be circular, square or any shape. In another embodiment, a cylindrically fed antenna creates an inward travelling feed wave. In such a case, the feed wave most naturally comes from a circular structure.

In one embodiment, antenna elements 103 comprise irises and the aperture antenna of FIG. 5 is used to generate a main beam shaped by using excitation from a cylindrical feed wave for radiating irises through tunable liquid crystal (LC) material. In one embodiment, the antenna can be excited to radiate a horizontally or vertically polarized electric field at desired scan angles.

In one embodiment, the antenna elements comprise a group of patch antennas. This group of patch antennas comprises an array of scattering metamaterial elements. In one embodiment, each scattering element in the antenna system is part of a unit cell that consists of a lower conductor, a dielectric substrate and an upper conductor that embeds a complementary electric inductive-capacitive resonator ("complementary electric LC" or "CELC") that is etched in or deposited onto the upper conductor. As would be understood by those skilled in the art, LC in the context of CELC refers to inductance-capacitance, as opposed to liquid crystal.

In one embodiment, a liquid crystal (LC) is disposed in the gap around the scattering element. This LC is driven by the direct drive embodiments described above. In one embodiment, liquid crystal is encapsulated in each unit cell and separates the lower conductor associated with a slot from an upper conductor associated with its patch. Liquid crystal has a permittivity that is a function of the orientation of the molecules comprising the liquid crystal, and the orientation of the molecules (and thus the permittivity) can be controlled by adjusting the bias voltage across the liquid crystal. Using this property, in one embodiment, the liquid crystal integrates an on/off switch for the transmission of energy from the guided wave to the CELC. When switched on, the CELC emits an electromagnetic wave like an electrically small dipole antenna. Note that the teachings herein are not limited to having a liquid crystal that operates in a binary fashion with respect to energy transmission.

In one embodiment, the feed geometry of this antenna system allows the antenna elements to be positioned at forty-five degree (45°) angles to the vector of the wave in the wave feed. Note that other positions may be used (e.g., at 40° angles). This position of the elements enables control of the free space wave received by or transmitted/radiated from the elements. In one embodiment, the antenna elements are arranged with an inter-element spacing that is less than a free-space wavelength of the operating frequency of the antenna. For example, if there are four scattering elements per wavelength, the elements in the 30 GHz transmit antenna will be approximately 2.5 mm (i.e., ¼th the 10 mm free-space wavelength of 30 GHz).

In one embodiment, the two sets of elements are perpendicular to each other and simultaneously have equal amplitude excitation if controlled to the same tuning state. Rotating them +/−45 degrees relative to the feed wave excitation achieves both desired features at once. Rotating one set 0 degrees and the other 90 degrees would achieve the perpendicular goal, but not the equal amplitude excitation goal. Note that 0 and 90 degrees may be used to achieve isolation when feeding the array of antenna elements in a single structure from two sides.

The amount of radiated power from each unit cell is controlled by applying a voltage to the patch (potential across the LC channel) using a controller. Traces to each patch are used to provide the voltage to the patch antenna. The voltage is used to tune or detune the capacitance and thus the resonance frequency of individual elements to effectuate beam forming. The voltage required is dependent on the liquid crystal mixture being used. The voltage tuning characteristic of liquid crystal mixtures is mainly described by a threshold voltage at which the liquid crystal starts to be affected by the voltage and the saturation voltage, above which an increase of the voltage does not cause major tuning in liquid crystal. These two characteristic parameters can change for different liquid crystal mixtures.

In one embodiment, as discussed above, a matrix drive is used to apply voltage to the patches in order to drive each cell separately from all the other cells without having a separate connection for each cell (direct drive). Because of the high density of elements, the matrix drive is an efficient way to address each cell individually.

In one embodiment, the control structure for the antenna system has 2 main components: the antenna array controller, which includes drive electronics, for the antenna system, is below the wave scattering structure, while the matrix drive switching array is interspersed throughout the radiating RF array in such a way as to not interfere with the radiation. In one embodiment, the drive electronics for the antenna system comprise commercial off-the shelf LCD controls used in commercial television appliances that adjust the bias voltage for each scattering element by adjusting the amplitude or duty cycle of an AC bias signal to that element.

In one embodiment, the antenna array controller also contains a microprocessor executing the software. The control structure may also incorporate sensors (e.g., a GPS receiver, a three-axis compass, a 3-axis accelerometer, 3-axis gyro, 3-axis magnetometer, etc.) to provide location and orientation information to the processor. The location and orientation information may be provided to the processor by other systems in the earth station and/or may not be part of the antenna system.

More specifically, the antenna array controller controls which elements are turned off and those elements turned on and at which phase and amplitude level at the frequency of operation. The elements are selectively detuned for frequency operation by voltage application.

For transmission, a controller supplies an array of voltage signals to the RF patches to create a modulation, or control pattern. The control pattern causes the elements to be turned to different states. In one embodiment, multistate control is used in which various elements are turned on and off to varying levels, further approximating a sinusoidal control pattern, as opposed to a square wave (i.e., a sinusoid gray shade modulation pattern). In one embodiment, some elements radiate more strongly than others, rather than some elements radiate and some do not. Variable radiation is achieved by applying specific voltage levels, which adjusts the liquid crystal permittivity to varying amounts, thereby detuning elements variably and causing some elements to radiate more than others.

The generation of a focused beam by the metamaterial array of elements can be explained by the phenomenon of constructive and destructive interference. Individual electromagnetic waves sum up (constructive interference) if they have the same phase when they meet in free space and waves cancel each other (destructive interference) if they are in opposite phase when they meet in free space. If the slots in a slotted antenna are positioned so that each successive slot is positioned at a different distance from the excitation point of the guided wave, the scattered wave from that element will have a different phase than the scattered wave of the previous slot. If the slots are spaced one quarter of a guided wavelength apart, each slot will scatter a wave with a one fourth phase delay from the previous slot.

Using the array, the number of patterns of constructive and destructive interference that can be produced can be increased so that beams can be pointed theoretically in any direction plus or minus ninety degrees (90°) from the bore sight of the antenna array, using the principles of holography. Thus, by controlling which metamaterial unit cells are turned on or off (i.e., by changing the pattern of which cells are turned on and which cells are turned off), a different pattern of constructive and destructive interference can be produced, and the antenna can change the direction of the main beam. The time required to turn the unit cells on and off dictates the speed at which the beam can be switched from one location to another location.

In one embodiment, the antenna system produces one steerable beam for the uplink antenna and one steerable beam for the downlink antenna. In one embodiment, the antenna system uses metamaterial technology to receive beams and to decode signals from the satellite and to form transmit beams that are directed toward the satellite. In one embodiment, the antenna systems are analog systems, in contrast to antenna systems that employ digital signal processing to electrically form and steer beams (such as phased array antennas). In one embodiment, the antenna system is considered a "surface" antenna that is planar and relatively low profile, especially when compared to conventional satellite dish receivers.

Figure 6:
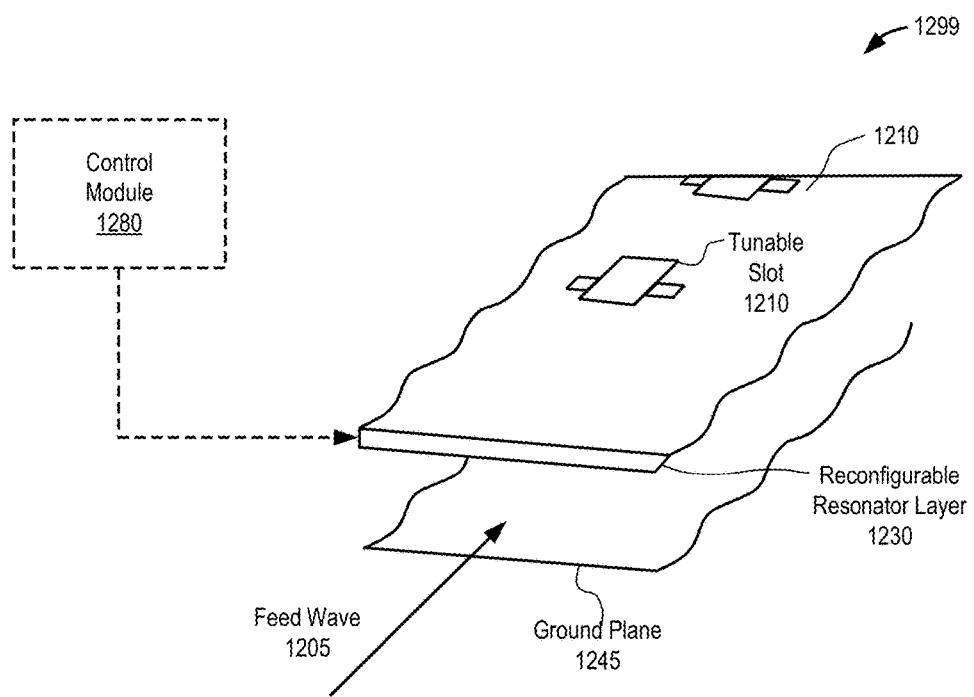
FIG. 6 illustrates a perspective view of one row of antenna elements that includes a ground plane and a reconfigurable resonator layer.

FIG. 6 illustrates a perspective view of one row of antenna elements that includes a ground plane and a reconfigurable resonator layer. Reconfigurable resonator layer 1230 includes an array of tunable slots 1210. The array of tunable slots 1210 can be configured to point the antenna in a desired direction. Each of the tunable slots can be tuned/adjusted by varying a voltage across the liquid crystal.

Figure 7:
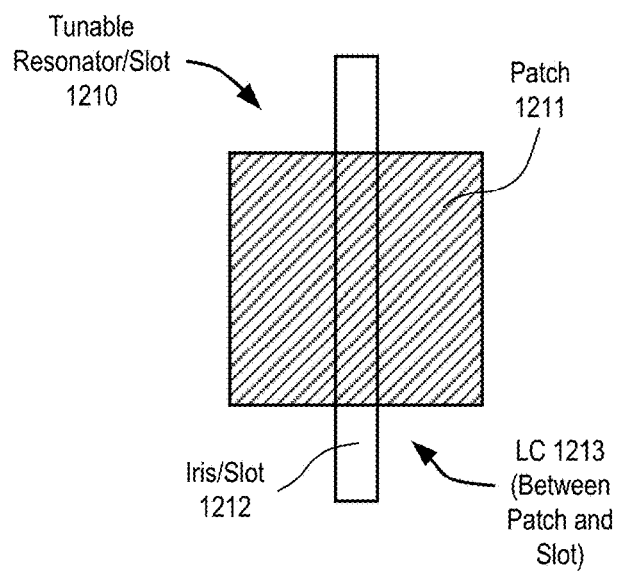
FIG. 7 illustrates one embodiment of a tunable resonator/slot 1210.

Control module 1280 is coupled to reconfigurable resonator layer 1230 to modulate the array of tunable slots 1210 by varying the voltage across the liquid crystal in FIG. 7. Control module 1280 may include a Field Programmable Gate Array ("FPGA"), a microprocessor, a controller, System-on-a-Chip (SoC), or other processing logic. In one embodiment, control module 1280 includes logic circuitry (e.g., multiplexer) to drive the array of tunable slots 1210. In one embodiment, control module 1280 receives data that includes specifications for a holographic diffraction pattern to be driven onto the array of tunable slots 1210. The holographic diffraction patterns may be generated in response to a spatial relationship between the antenna and a satellite so that the holographic diffraction pattern steers the downlink beams (and uplink beam if the antenna system performs transmit) in the appropriate direction for communication. Although not drawn in each figure, a control module similar to control module 1280 may drive each array of tunable slots described in the figures of the disclosure.

Radio Frequency ("RF") holography is also possible using analogous techniques where a desired RF beam can be generated when an RF reference beam encounters an RF holographic diffraction pattern. In the case of satellite communications, the reference beam is in the form of a feed wave, such as feed wave 1205 (approximately 20 GHz in some embodiments). To transform a feed wave into a radiated beam (either for transmitting or receiving purposes), an interference pattern is calculated between the desired RF beam (the object beam) and the feed wave (the reference beam). The interference pattern is driven onto the array of tunable slots 1210 as a diffraction pattern so that the feed wave is "steered" into the desired RF beam (having the desired shape and direction). In other words, the feed wave encountering the holographic diffraction pattern "reconstructs" the object beam, which is formed according to design requirements of the communication system. The holographic diffraction pattern contains the excitation of each element and is calculated by $w_{hologram} = w_{in}^* w_{out}$, with $w_{in}$ as the wave equation in the waveguide and $w_{out}$ the wave equation on the outgoing wave.

FIG. 7 illustrates one embodiment of a tunable resonator/slot 1210. Tunable slot 1210 includes an iris/slot 1212, a radiating patch 1211, and liquid crystal 1213 disposed between iris 1212 and patch 1211. In one embodiment, radiating patch 1211 is co-located with iris 1212.

Figure 8:
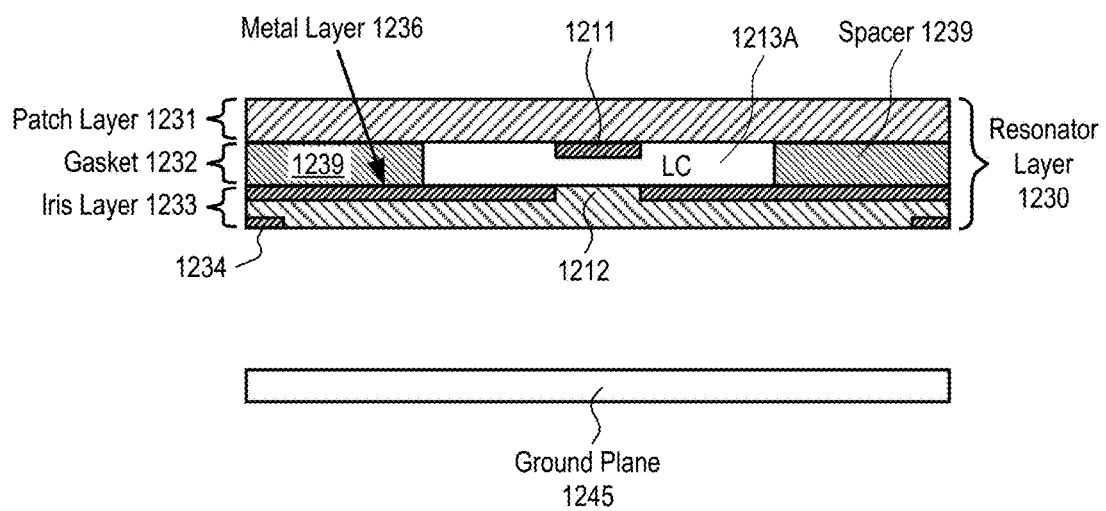
FIG. 8 illustrates a cross section view of one embodiment of a physical antenna aperture.

FIG. 8 illustrates a cross section view of one embodiment of a physical antenna aperture. The antenna aperture includes ground plane 1245, and a metal layer 1236 within iris layer 1233, which is included in reconfigurable resonator layer 1230. In one embodiment, the antenna aperture of FIG. 8 includes a plurality of tunable resonator/slots 1210 of FIG. 7. Iris/slot 1212 is defined by openings in metal layer 1236. A feed wave, such as feed wave 1205 of FIG. 7, may have a microwave frequency compatible with satellite communication channels. The feed wave propagates between ground plane 1245 and resonator layer 1230.

Reconfigurable resonator layer 1230 also includes gasket layer 1232 and patch layer 1231. Gasket layer 1232 is disposed between patch layer 1231 and iris layer 1233. Note that in one embodiment, a spacer could replace gasket layer 1232. In one embodiment, iris layer 1233 is a printed circuit board ("PCB") that includes a copper layer as metal layer 1236. In one embodiment, iris layer 1233 is glass. Iris layer 1233 may be other types of substrates.

Openings may be etched in the copper layer to form slots 1212. In one embodiment, iris layer 1233 is conductively coupled by a conductive bonding layer to another structure (e.g., a waveguide) in FIG. 8. Note that in an embodiment the iris layer is not conductively coupled by a conductive bonding layer and is instead interfaced with a non-conducting bonding layer.

Patch layer 1231 may also be a PCB that includes metal as radiating patches 1211. In one embodiment, gasket layer 1232 includes spacers 1239 that provide a mechanical standoff to define the dimension between metal layer 1236 and patch 1211. In one embodiment, the spacers are 75 microns, but other sizes may be used (e.g., 3-200 mm). As mentioned above, in one embodiment, the antenna aperture of FIG. 8 includes multiple tunable resonator/slots, such as tunable resonator/slot 1210 includes patch 1211, liquid crystal 1213A, and iris 1212 of FIG. 7. The chamber for liquid crystal 1213A is defined by spacers 1239, iris layer 1233 and metal layer 1236. When the chamber is filled with liquid crystal, patch layer 1231 can be laminated onto spacers 1239 to seal liquid crystal within resonator layer 1230.

A voltage between patch layer 1231 and iris layer 1233 can be modulated to tune the liquid crystal in the gap between the patch and the slots (e.g., tunable resonator/slot 1210). Adjusting the voltage across liquid crystal 1213A varies the capacitance of a slot (e.g., tunable resonator/slot 1210). Accordingly, the reactance of a slot (e.g., tunable resonator/slot 1210) can be varied by changing the capacitance. Resonant frequency of slot 1210 also changes according to the equation $$f = \frac{1}{2\pi\sqrt{LC}}$$

where f is the resonant frequency of slot 1210 and L and C are the inductance and capacitance of slot 1210, respectively. The resonant frequency of slot 1210 affects the energy radiated from feed wave 1205 propagating through the waveguide. As an example, if feed wave 1205 is 20 GHz, the resonant frequency of a slot 1210 may be adjusted (by varying the capacitance) to 17 GHz so that the slot 1210 couples substantially no energy from feed wave 1205. Or, the resonant frequency of a slot 1210 may be adjusted to 20 GHz so that the slot 1210 couples energy from feed wave 1205 and radiates that energy into free space. Although the examples given are binary (fully radiating or not radiating at all), full gray scale control of the reactance, and therefore the resonant frequency of slot 1210 is possible with voltage variance over a multi-valued range. Hence, the energy radiated from each slot 1210 can be finely controlled so that detailed holographic diffraction patterns can be formed by the array of tunable slots.

In one embodiment, tunable slots in a row are spaced from each other by $\lambda/5$. Other spacings may be used. In one embodiment, each tunable slot in a row is spaced from the closest tunable slot in an adjacent row by $\lambda/2$, and, thus, commonly oriented tunable slots in different rows are spaced by $\lambda/4$, though other spacings are possible (e.g., $\lambda/5$, $\lambda/6.3$). In another embodiment, each tunable slot in a row is spaced from the closest tunable slot in an adjacent row by $\lambda/3$.

Embodiments use reconfigurable metamaterial technology, such as described in U.S. patent application Ser. No. 14/550,178, entitled "Dynamic Polarization and Coupling Control from a Steerable Cylindrically Fed Holographic Antenna", filed Nov. 21, 2014 and U.S. patent application Ser. No. 14/610,502, entitled "Ridged Waveguide Feed Structures for Reconfigurable Antenna", filed Jan. 30, 2015.

FIGS. 9A-D illustrate one embodiment of the different layers for creating the slotted array. The antenna array includes antenna elements that are positioned in rings, such as the example rings shown in FIG. 5. Note that in this example the antenna array has two different types of antenna elements that are used for two different types of frequency bands.

Figures 9A, 9B:
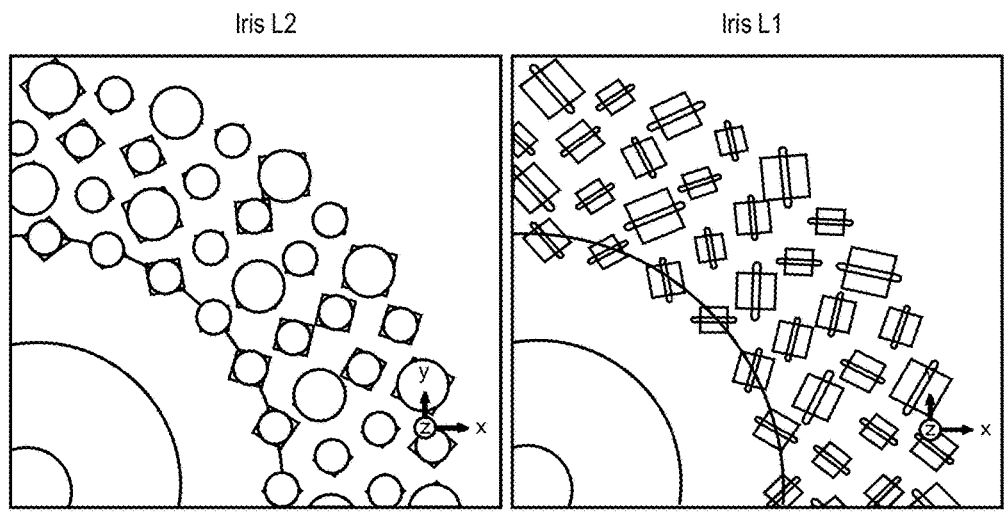
FIG. 9A illustrates a portion of the first iris board layer with locations corresponding to the slots.
FIG. 9B illustrates a portion of the second iris board layer containing slots.
Figures 9C, 9D:
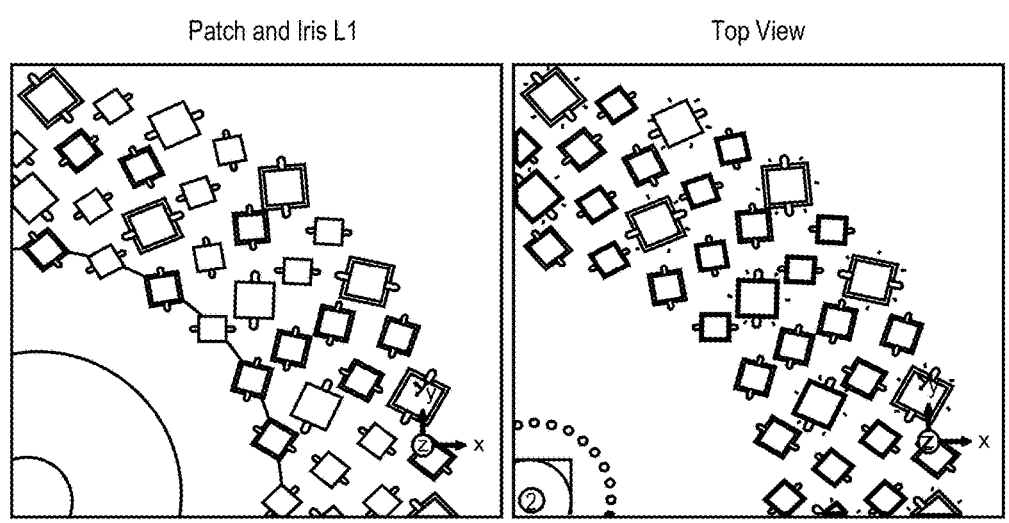
FIG. 9C illustrates patches over a portion of the second iris board layer.
FIG. 9D illustrates a top view of a portion of the slotted array.

FIG. 9A illustrates a portion of the first iris board layer with locations corresponding to the slots. Referring to FIG. 9A, the circles are open areas/slots in the metallization in the bottom side of the iris substrate, and are for controlling the coupling of elements to the feed (the feed wave). Note that this layer is an optional layer and is not used in all designs. FIG. 9B illustrates a portion of the second iris board layer containing slots. FIG. 9C illustrates patches over a portion of the second iris board layer. FIG. 9D illustrates a top view of a portion of the slotted array.

Figure 10:
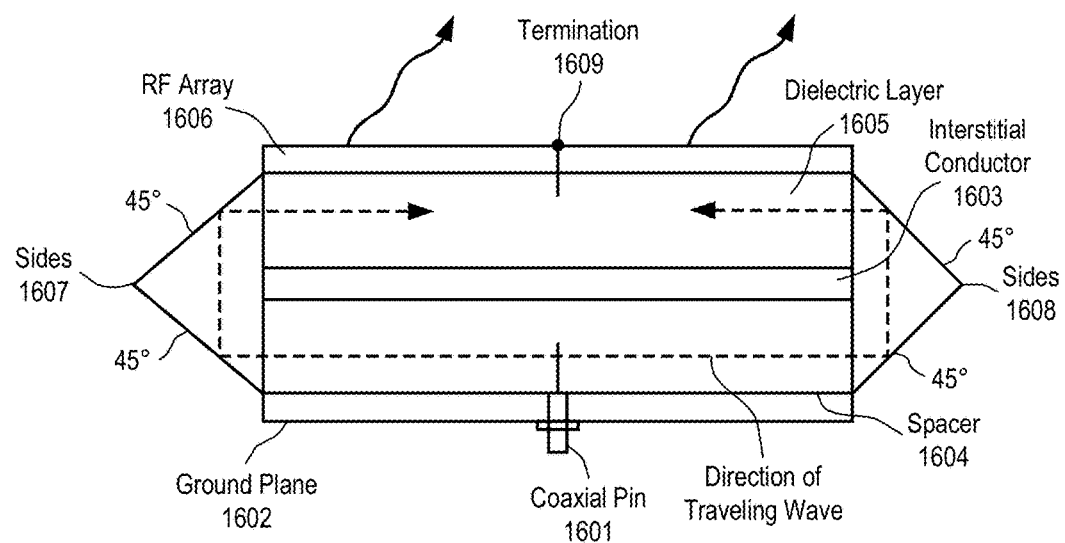
FIG. 10 illustrates a side view of one embodiment of a cylindrically fed antenna structure.

FIG. 10 illustrates a side view of one embodiment of a cylindrically fed antenna structure. The antenna produces an inwardly travelling wave using a double layer feed structure (i.e., two layers of a feed structure). In one embodiment, the antenna includes a circular outer shape, though this is not required. That is, non-circular inward travelling structures can be used. In one embodiment, the antenna structure in FIG. 10 includes a coaxial feed, such as, for example, described in U.S. Publication No. 2015/0236412, entitled "Dynamic Polarization and Coupling Control from a Steerable Cylindrically Fed Holographic Antenna", filed on Nov. 21, 2014.

Referring to FIG. 10, a coaxial pin 1601 is used to excite the field on the lower level of the antenna. In one embodiment, coaxial pin 1601 is a 50Ω coax pin that is readily available. Coaxial pin 1601 is coupled (e.g., bolted) to the bottom of the antenna structure, which is conducting ground plane 1602.

Separate from conducting ground plane 1602 is interstitial conductor 1603, which is an internal conductor. In one embodiment, conducting ground plane 1602 and interstitial conductor 1603 are parallel to each other. In one embodiment, the distance between ground plane 1602 and interstitial conductor 1603 is 0.1-0.15". In another embodiment, this distance may be $\lambda/2$, where $\lambda$ is the wavelength of the travelling wave at the frequency of operation.

Ground plane 1602 is separated from interstitial conductor 1603 via a spacer 1604. In one embodiment, spacer 1604 is a foam or air-like spacer. In one embodiment, spacer 1604 comprises a plastic spacer.

On top of interstitial conductor 1603 is dielectric layer 1605. In one embodiment, dielectric layer 1605 is plastic. The purpose of dielectric layer 1605 is to slow the travelling wave relative to free space velocity. In one embodiment, dielectric layer 1605 slows the travelling wave by 30% relative to free space. In one embodiment, the range of indices of refraction that are suitable for beam forming are 1.2-1.8, where free space has by definition an index of refraction equal to 1. Other dielectric spacer materials, such as, for example, plastic, may be used to achieve this effect. Note that materials other than plastic may be used as long as they achieve the desired wave slowing effect. Alternatively, a material with distributed structures may be used as dielectric 1605, such as periodic sub-wavelength metallic structures that can be machined or lithographically defined, for example.

An RF-array 1606 is on top of dielectric 1605. In one embodiment, the distance between interstitial conductor 1603 and RF-array 1606 is 0.1-0.15". In another embodiment, this distance may be $\lambda_{eff}/2$, where $\lambda_{eff}$ is the effective wavelength in the medium at the design frequency.

The antenna includes sides 1607 and 1608. Sides 1607 and 1608 are angled to cause a travelling wave feed from coax pin 1601 to be propagated from the area below interstitial conductor 1603 (the spacer layer) to the area above interstitial conductor 1603 (the dielectric layer) via reflection. In one embodiment, the angle of sides 1607 and 1608 are at 45° angles. In an alternative embodiment, sides 1607 and 1608 could be replaced with a continuous radius to achieve the reflection. While FIG. 10 shows angled sides that have angle of 45 degrees, other angles that accomplish signal transmission from lower level feed to upper level feed may be used. That is, given that the effective wavelength in the lower feed will generally be different than in the upper feed, some deviation from the ideal 45° angles could be used to aid transmission from the lower to the upper feed level. For example, in another embodiment, the 45° angles are replaced with a single step. The steps on one end of the antenna go around the dielectric layer, interstitial the conductor, and the spacer layer. The same two steps are at the other ends of these layers.

In operation, when a feed wave is fed in from coaxial pin 1601, the wave travels outward concentrically oriented from coaxial pin 1601 in the area between ground plane 1602 and interstitial conductor 1603. The concentrically outgoing waves are reflected by sides 1607 and 1608 and travel inwardly in the area between interstitial conductor 1603 and RF array 1606. The reflection from the edge of the circular perimeter causes the wave to remain in phase (i.e., it is an in-phase reflection). The travelling wave is slowed by dielectric layer 1605. At this point, the travelling wave starts interacting and exciting with elements in RF array 1606 to obtain the desired scattering.

To terminate the travelling wave, a termination 1609 is included in the antenna at the geometric center of the antenna. In one embodiment, termination 1609 comprises a pin termination (e.g., a 50Ω pin). In another embodiment, termination 1609 comprises an RF absorber that terminates unused energy to prevent reflections of that unused energy back through the feed structure of the antenna. These could be used at the top of RF array 1606.

Figure 11:
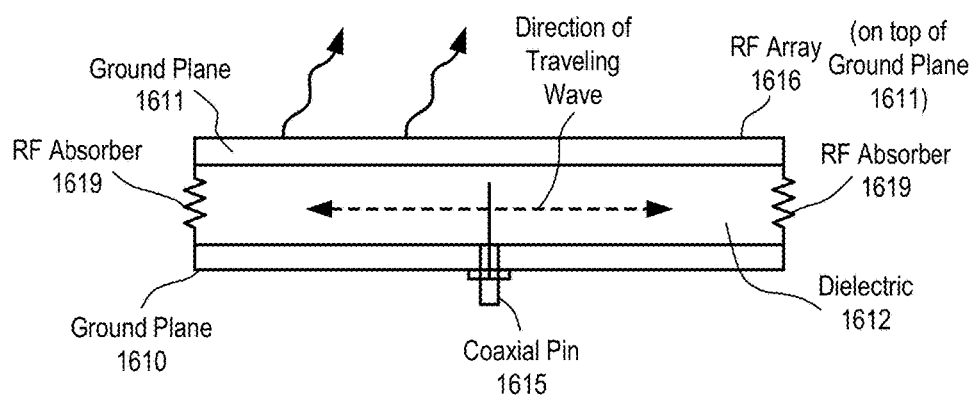
FIG. 11 illustrates another embodiment of the antenna system with an outgoing wave.

FIG. 11 illustrates another embodiment of the antenna system with an outgoing wave. Referring to FIG. 11, two ground planes 1610 and 1611 are substantially parallel to each other with a dielectric layer 1612 (e.g., a plastic layer, etc.) in between ground planes. RF absorbers 1619 (e.g., resistors) couple the two ground planes 1610 and 1611 together. A coaxial pin 1615 (e.g., 50Ω) feeds the antenna. An RF array 1616 is on top of dielectric layer 1612 and ground plane 1611.

In operation, a feed wave is fed through coaxial pin 1615 and travels concentrically outward and interacts with the elements of RF array 1616.

The cylindrical feed in both the antennas of FIGS. 10 and 11 improves the service angle of the antenna. Instead of a service angle of plus or minus forty-five degrees azimuth (±45° Az) and plus or minus twenty-five degrees elevation (±25° El), in one embodiment, the antenna system has a service angle of seventy-five degrees (75°) from the bore sight in all directions. As with any beam forming antenna comprised of many individual radiators, the overall antenna gain is dependent on the gain of the constituent elements, which themselves are angle-dependent. When using common radiating elements, the overall antenna gain typically decreases as the beam is pointed further off bore sight. At 75 degrees off bore sight, significant gain degradation of about 6 dB is expected.

Embodiments of the antenna having a cylindrical feed solve one or more problems. These include dramatically simplifying the feed structure compared to antennas fed with a corporate divider network and therefore reducing total required antenna and antenna feed volume; decreasing sensitivity to manufacturing and control errors by maintaining high beam performance with coarser controls (extending all the way to simple binary control); giving a more advantageous side lobe pattern compared to rectilinear feeds because the cylindrically oriented feed waves result in spatially diverse side lobes in the far field; and allowing polarization to be dynamic, including allowing left-hand circular, right-hand circular, and linear polarizations, while not requiring a polarizer.

Array of Wave Scattering Elements

RF array 1606 of FIG. 10 and RF array 1616 of FIG. 11 include a wave scattering subsystem that includes a group of patch antennas (i.e., scatterers) that act as radiators. This group of patch antennas comprises an array of scattering metamaterial elements.

In one embodiment, each scattering element in the antenna system is part of a unit cell that consists of a lower conductor, a dielectric substrate and an upper conductor that embeds a complementary electric inductive-capacitive resonator ("complementary electric LC" or "CELC") that is etched in or deposited onto the upper conductor.

In one embodiment, a liquid crystal (LC) is injected in the gap around the scattering element. Liquid crystal is encapsulated in each unit cell and separates the lower conductor associated with a slot from an upper conductor associated with its patch. Liquid crystal has a permittivity that is a function of the orientation of the molecules comprising the liquid crystal, and the orientation of the molecules (and thus the permittivity) can be controlled by adjusting the bias voltage across the liquid crystal. Using this property, the liquid crystal acts as an on/off switch for the transmission of energy from the guided wave to the CELC. When switched on, the CELC emits an electromagnetic wave like an electrically small dipole antenna.

Controlling the thickness of the LC increases the beam switching speed. A fifty percent (50%) reduction in the gap between the lower and the upper conductor (the thickness of the liquid crystal) results in a fourfold increase in speed. In another embodiment, the thickness of the liquid crystal results in a beam switching speed of approximately fourteen milliseconds (14 ms). In one embodiment, the LC is doped in a manner well-known in the art to improve responsiveness so that a seven millisecond (7 ms) requirement can be met.

The CELC element is responsive to a magnetic field that is applied parallel to the plane of the CELC element and perpendicular to the CELC gap complement. When a voltage is applied to the liquid crystal in the metamaterial scattering unit cell, the magnetic field component of the guided wave induces a magnetic excitation of the CELC, which, in turn, produces an electromagnetic wave in the same frequency as the guided wave.

The phase of the electromagnetic wave generated by a single CELC can be selected by the position of the CELC on the vector of the guided wave. Each cell generates a wave in phase with the guided wave parallel to the CELC. Because the CELCs are smaller than the wave length, the output wave has the same phase as the phase of the guided wave as it passes beneath the CELC.

In one embodiment, the cylindrical feed geometry of this antenna system allows the CELC elements to be positioned at forty-five degree (45°) angles to the vector of the wave in the wave feed. This position of the elements enables control of the polarization of the free space wave generated from or received by the elements. In one embodiment, the CELCs are arranged with an inter-element spacing that is less than a free-space wavelength of the operating frequency of the antenna. For example, if there are four scattering elements per wavelength, the elements in the 30 GHz transmit antenna will be approximately 2.5 mm (i.e., ¼th the 10 mm free-space wavelength of 30 GHz).

In one embodiment, the CELCs are implemented with patch antennas that include a patch co-located over a slot with liquid crystal between the two. In this respect, the metamaterial antenna acts like a slotted (scattering) wave guide. With a slotted wave guide, the phase of the output wave depends on the location of the slot in relation to the guided wave.

Cell Placement

Figure 12:
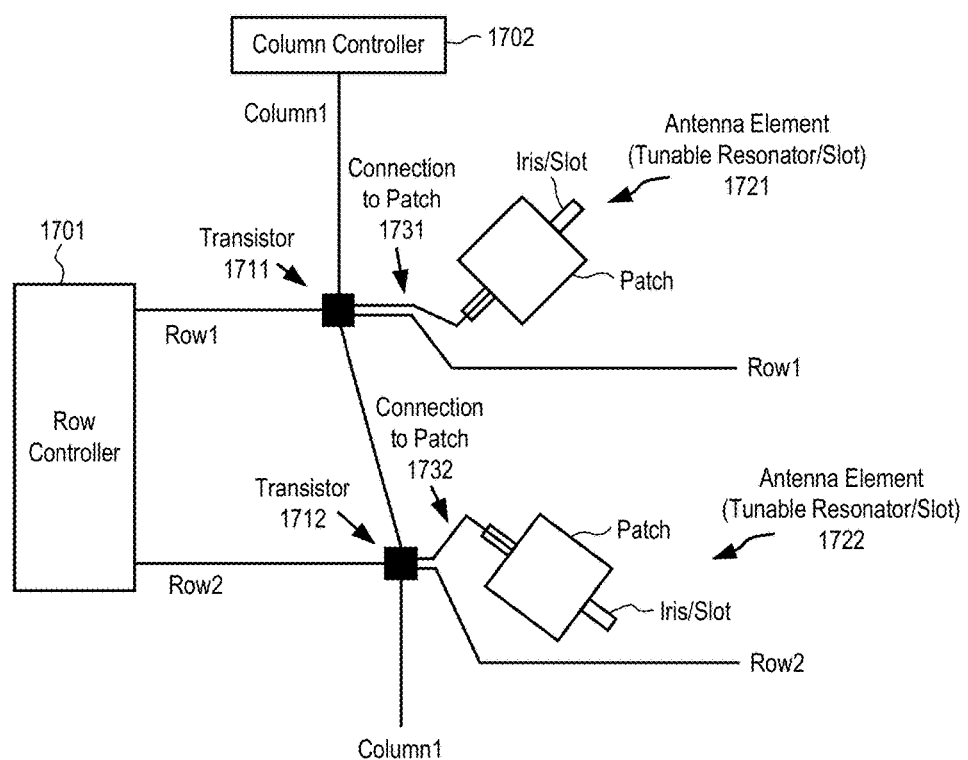
FIG. 12 illustrates one embodiment of the placement of matrix drive circuitry with respect to antenna elements.

In one embodiment, the antenna elements are placed on the cylindrical feed antenna aperture in a way that allows for a systematic matrix drive circuit. The placement of the cells includes placement of the transistors for the matrix drive. FIG. 12 illustrates one embodiment of the placement of matrix drive circuitry with respect to antenna elements. Referring to FIG. 12, row controller 1701 is coupled to transistors 1711 and 1712, via row select signals Row1 and Row2, respectively, and column controller 1702 is coupled to transistors 1711 and 1712 via column select signal Column1. Transistor 1711 is also coupled to antenna element 1721 via connection to patch 1731, while transistor 1712 is coupled to antenna element 1722 via connection to patch 1732.

In an initial approach to realize matrix drive circuitry on the cylindrical feed antenna with unit cells placed in a non-regular grid, two steps are performed. In the first step, the cells are placed on concentric rings and each of the cells is connected to a transistor that is placed beside the cell and acts as a switch to drive each cell separately. In the second step, the matrix drive circuitry is built in order to connect every transistor with a unique address as the matrix drive approach requires. Because the matrix drive circuit is built by row and column traces (similar to LCDs) but the cells are placed on rings, there is no systematic way to assign a unique address to each transistor. This mapping problem results in very complex circuitry to cover all the transistors and leads to a significant increase in the number of physical traces to accomplish the routing. Because of the high density of cells, those traces disturb the RF performance of the antenna due to coupling effect. Also, due to the complexity of traces and high packing density, the routing of the traces cannot be accomplished by commercially available layout tools.

In one embodiment, the matrix drive circuitry is pre-defined before the cells and transistors are placed. This ensures a minimum number of traces that are necessary to drive all the cells, each with a unique address. This strategy reduces the complexity of the drive circuitry and simplifies the routing, which subsequently improves the RF performance of the antenna.

More specifically, in one approach, in the first step, the cells are placed on a regular rectangular grid composed of rows and columns that describe the unique address of each cell. In the second step, the cells are grouped and transformed to concentric circles while maintaining their address and connection to the rows and columns as defined in the first step. A goal of this transformation is not only to put the cells on rings but also to keep the distance between cells and the distance between rings constant over the entire aperture. In order to accomplish this goal, there are several ways to group the cells.

Figure 13:
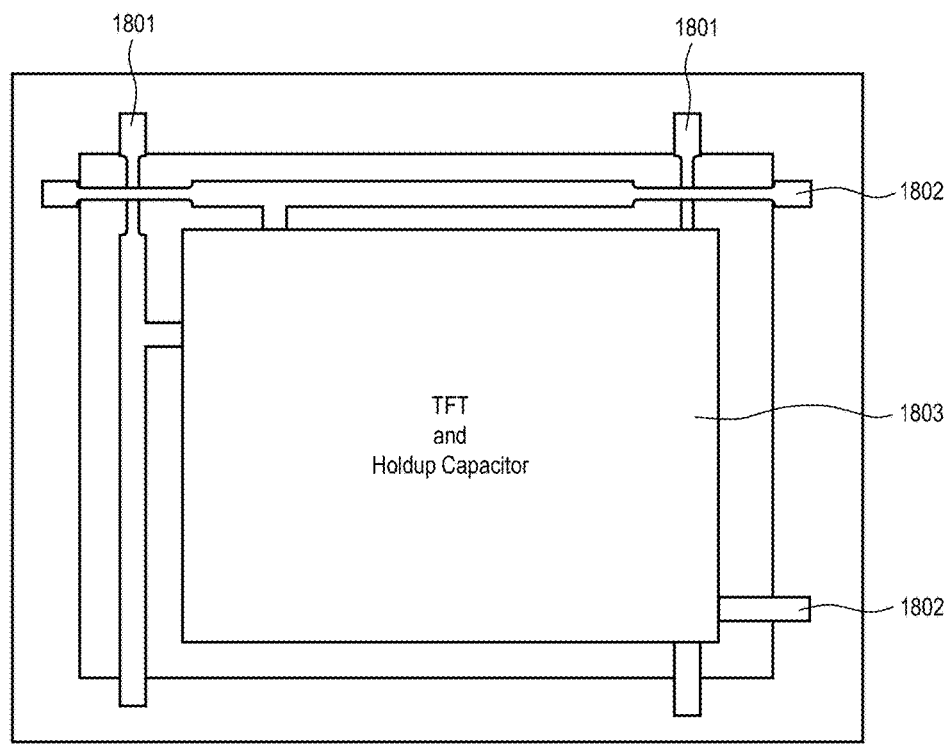
FIG. 13 illustrates one embodiment of a TFT package.

In one embodiment, a TFT package is used to enable placement and unique addressing in the matrix drive. FIG. 13 illustrates one embodiment of a TFT package. Referring to FIG. 13, a TFT and a hold capacitor 1803 is shown with input and output ports. There are two input ports connected to traces 1801 and two output ports connected to traces 1802 to connect the TFTs together using the rows and columns. In one embodiment, the row and column traces cross in 90° angles to reduce, and potentially minimize, the coupling between the row and column traces. In one embodiment, the row and column traces are on different layers.

An Example of a Full Duplex Communication System

Figure 14:
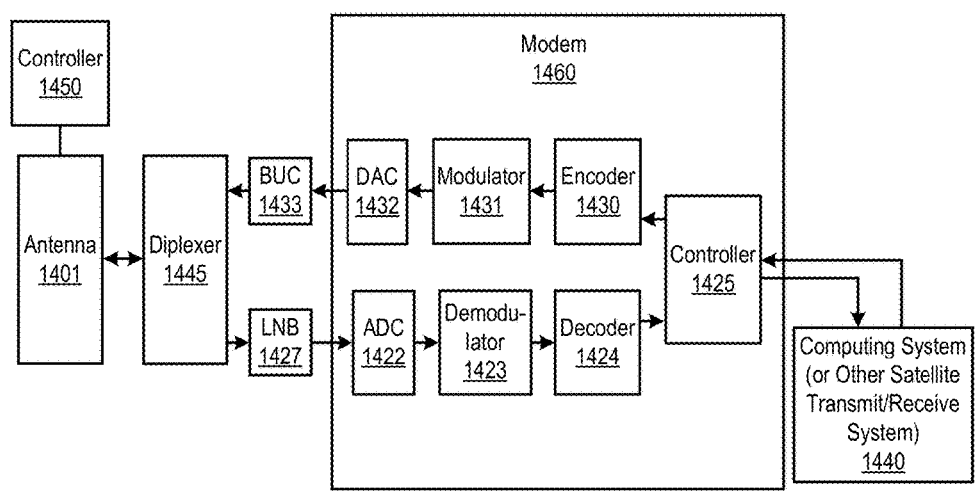
FIG. 14 is a block diagram of another embodiment of a communication system having simultaneous transmit and receive paths.

In another embodiment, the combined antenna apertures are used in a full duplex communication system. FIG. 14 is a block diagram of another embodiment of a communication system having simultaneous transmit and receive paths. While only one transmit path and one receive path are shown, the communication system may include more than one transmit path and/or more than one receive path.

Referring to FIG. 14, antenna 1401 includes two spatially interleaved antenna arrays operable independently to transmit and receive simultaneously at different frequencies as described above. In one embodiment, antenna 1401 is coupled to diplexer 1445. The coupling may be by one or more feeding networks. In one embodiment, in the case of a radial feed antenna, diplexer 1445 combines the two signals and the connection between antenna 1401 and diplexer 1445 is a single broad-band feeding network that can carry both frequencies.

Diplexer 1445 is coupled to a low noise block down converter (LNBs) 1427, which performs a noise filtering function and a down conversion and amplification function in a manner well-known in the art. In one embodiment, LNB 1427 is in an out-door unit (ODU). In another embodiment, LNB 1427 is integrated into the antenna apparatus. LNB 1427 is coupled to a modem 1460, which is coupled to computing system 1440 (e.g., a computer system, modem, etc.).

Modem 1460 includes an analog-to-digital converter (ADC) 1422, which is coupled to LNB 1427, to convert the received signal output from diplexer 1445 into digital format. Once converted to digital format, the signal is demodulated by demodulator 1423 and decoded by decoder 1424 to obtain the encoded data on the received wave. The decoded data is then sent to controller 1425, which sends it to computing system 1440.

Modem 1460 also includes an encoder 1430 that encodes data to be transmitted from computing system 1440. The encoded data is modulated by modulator 1431 and then converted to analog by digital-to-analog converter (DAC) 1432. The analog signal is then filtered by a BUC (up-convert and high pass amplifier) 1433 and provided to one port of diplexer 1445. In one embodiment, BUC 1433 is in an out-door unit (ODU).

Diplexer 1445 operating in a manner well-known in the art provides the transmit signal to antenna 1401 for transmission.

Controller 1450 controls antenna 1401, including the two arrays of antenna elements on the single combined physical aperture.

The communication system would be modified to include the combiner/arbiter described above. In such a case, the combiner/arbiter after the modem but before the BUC and LNB.

Note that the full duplex communication system shown in FIG. 14 has a number of applications, including but not limited to, internet communication, vehicle communication (including software updating), etc.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. An antenna comprising:
   a physical antenna aperture having an array of radio frequency (RF) surface scattering antenna elements that are controlled and operable together to form a beam for the frequency band for use in holographic beam steering; and
   a compensation controller to perform compensation on the antenna elements based on monitored antenna conditions, wherein the monitored antenna conditions comprise one or more of LC aging and phase aperture illumination.

2. The antenna defined in claim 1 wherein each of the antenna elements comprises a liquid crystal (LC) and the monitored conditions affect performance of the LC in the antenna elements, and further wherein the compensation comprises making a voltage adjustment to a voltage applied to one or more of the antenna elements.

3. The antenna defined in claim 1 wherein the antenna conditions further comprises one or more of temperature, humidity, and pressure.

4. The antenna defined in claim 1 wherein the compensation controller is operable to determine whether compensation is needed via software.

5. The antenna defined in claim 1 further comprising monitoring logic including a circuit having a test antenna element on the antenna aperture for monitoring to obtain data corresponding to the monitored antenna conditions.

6. The antenna defined in claim 5 wherein the controller is operable to monitor discharge time associated with the test element and determine compensation based on results of monitoring the test antenna element.

7. The antenna defined in claim 6 wherein the controller is operable to cause voltage applied to LCs of antenna elements in the array to be adjusted as part of compensation to achieve a desired aperture illumination based on monitored discharge time of the test antenna element.

8. The antenna defined in claim 7 wherein the test antenna element and the LCs in the array are different in size and an amount of voltage adjustment to the LCs in the antenna elements in the array is a scaled version of the voltage adjustment that would be necessary to apply to the test antenna element to achieve the desired illumination.

9. The antenna defined in claim 1 wherein the array comprises a tunable slotted array of antenna elements.

10. The antenna defined in claim 9 wherein elements in the tunable slotted array are positioned in one or more rings.

11. The antenna defined in claim 9 wherein each slotted array comprises a plurality of slots and further wherein each slot is tuned to provide a desired scattering at a given frequency.

12. The antenna defined in claim 11 wherein each slot of the plurality of slots is oriented either +45 degrees or −45 degrees relative to the cylindrical feed wave impinging at a central location of each said slot, such that the slotted array includes a first set of slots rotated +45 degrees relative to the cylindrical feed wave propagation direction and a second set of slots rotated −45 degrees relative to the propagation direction of the cylindrical feed wave.

13. The antenna defined in claim 9 wherein each slotted array comprises:
   a plurality of slots;
   a plurality of patches, wherein each of the patches is co-located over and separated from a slot in the plurality of slots, forming a patch/slot pair, each patch/slot pair being turned off or on based on application of a voltage to the patch in the pair; and a controller that applies a control pattern that controls which patch/slot pairs are on and off, thereby causing generation of a beam.

14. A method comprising:

monitoring a plurality of antenna conditions associated with a flat panel antenna having a physical antenna aperture having an array of surface scattering antenna elements that are controlled and operable together to form a beam for the frequency band for use in holographic beam steering, wherein the plurality of antenna conditions comprises one or more of LC aging and phase aperture illumination;

determining whether to perform compensation on antenna elements of the array based on monitored antenna conditions, wherein the monitored antenna conditions affect performance of the RF radiating metamaterial antenna elements; and adjusting voltage applied to one or more of the antenna elements as part of the compensation based on the monitored antenna conditions in response to determining to perform compensation on the antenna elements.

15. The method defined in claim 14 wherein the conditions further comprise one or more of temperature, humidity, and pressure.

16. The method defined in claim 14 wherein monitoring a plurality of antenna conditions comprises monitoring a test antenna element on the aperture that is a replica of the antenna elements to obtain data corresponding to the monitored conditions.

17. The method defined in claim 16 further comprising receiving a discharge time associated with the test antenna element and determining compensation based on the discharge time.

18. The method defined in claim 17 wherein the test antenna element and the LCs in the array are different in size and wherein adjusting voltage applied to one or more of the antenna elements as part of the compensation comprises selecting an amount of voltage adjustment to the LCs in the antenna elements in the array that represents a scaled version of the voltage adjustment that would be necessary to apply to the test antenna element to achieve a desired illumination.

19. The method defined in claim 14 wherein adjusting voltage applied to one or more of the antenna elements as part of the compensation comprises selecting a new pattern to be applied to the antenna elements of the array to cause voltage applied to LCs of antenna elements in array to be adjusted.

20. The method defined in claim 14 wherein the array comprises a tunable slotted array of antenna elements.

21. A non-transitory computer readable storage medium that stores instructions, which when executed an antenna system, causes the antenna system to perform a method comprising:

monitoring a plurality of antenna conditions associated with a flat panel antenna having a physical antenna aperture having an array of surface scattering antenna elements that are controlled and operable together to form a beam for the frequency band for use in holographic beam steering, wherein the plurality of antenna conditions comprise one or more of LC aging and phase aperture illumination;

determining whether to perform compensation on antenna elements of the array based on monitored antenna conditions, wherein the monitored antenna conditions affect performance of the RF radiating metamaterial antenna elements; and adjusting voltage applied to one or more of the antenna elements as part of the compensation based on the monitored antenna conditions in response to determining to perform compensation on the antenna elements.

22. The computer readable storage medium defined in claim 21 wherein the conditions further comprise one or more of temperature, humidity, and pressure.

23. The computer readable storage medium defined in claim 21 wherein monitoring a plurality of antenna conditions comprises monitoring a test antenna element on the aperture that is a replica of the antenna elements to obtain data corresponding to the monitored conditions.

24. The computer readable storage medium defined in claim 23 wherein the method further comprises receiving a discharge time associated with the test antenna element and determining compensation based on the discharge time.

25. The computer readable storage medium defined in claim 24 wherein the test antenna element and the LCs in the array are different in size and wherein adjusting voltage applied to one or more of the antenna elements as part of the compensation comprises selecting an amount of voltage adjustment to the LCs in the antenna elements in the array that represents a scaled version of the voltage adjustment that would be necessary to apply to the test antenna element to achieve a desired illumination.

26. The computer readable storage medium defined in claim 21 wherein adjusting voltage applied to one or more of the antenna elements as part of the compensation comprises selecting a new pattern to be applied to the antenna elements of the array to cause voltage applied to LCs of antenna elements in array to be adjusted.

* * * * *